US011576201B2

(12) United States Patent
Abotabl et al.

(10) Patent No.: US 11,576,201 B2
(45) Date of Patent: Feb. 7, 2023

(54) CANDIDATE UPLINK GRANTS FOR CHANNEL ACCESS

(71) Applicant: QUALCOMM Incorporated, San Diego, CA (US)

(72) Inventors: Ahmed Attia Abotabl, San Diego, CA (US); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 17/116,986

(22) Filed: Dec. 9, 2020

(65) Prior Publication Data

US 2022/0183048 A1 Jun. 9, 2022

(51) Int. Cl.
*H04W 72/14* (2009.01)
*H04W 72/1268* (2023.01)
*H04W 16/14* (2009.01)
*H04W 72/12* (2023.01)

(52) U.S. Cl.
CPC ........... *H04W 72/14* (2013.01); *H04W 16/14* (2013.01); *H04W 72/1257* (2013.01); *H04W 72/1268* (2013.01); *H04W 72/1289* (2013.01)

(58) Field of Classification Search
CPC ............... H04W 72/042; H04W 72/14; H04W 74/0808; H04W 72/0453; H04W 72/0446; H04W 16/14; H04W 72/1284; H04W 74/0816; H04W 72/04; H04W 4/70; H04W 72/0413
USPC ........................................ 370/328, 329, 330
See application file for complete search history.

(56) References Cited

U.S. PATENT DOCUMENTS

| 11,109,352 B2 * | 8/2021 | Alasti ................... H04L 5/0053 |
| 11,394,501 B2 * | 7/2022 | Yeo ........................ H04L 5/0053 |
| 2013/0028223 A1 * | 1/2013 | Kim ................... H04W 72/0446 370/329 |
| 2014/0204919 A1 * | 7/2014 | Chen ..................... H04B 7/2681 370/336 |
| 2016/0183296 A1 * | 6/2016 | Yerramalli ........ H04W 72/0413 370/329 |
| 2016/0338089 A1 * | 11/2016 | Vos ........................ H04L 5/0041 |
| 2018/0176945 A1 * | 6/2018 | Cao ........................ H04L 5/0055 |
| 2019/0223215 A1 * | 7/2019 | Tian .......................... H04L 1/00 |
| 2019/0372727 A1 * | 12/2019 | Joseph ............. H04W 72/1289 |
| 2020/0053760 A1 * | 2/2020 | Liu .................... H04W 72/1289 |

* cited by examiner

*Primary Examiner* — David Q Nguyen
(74) *Attorney, Agent, or Firm* — Holland & Hart LLP

(57) ABSTRACT

Methods, systems, and devices for wireless communications are described. A base station may transmit control signaling including a candidate uplink grant configuration to a user equipment (UE). The candidate uplink grant configuration may include an indication of multiple candidate uplink grants for an uplink grant, each candidate uplink grant indicating one or more resource block sets configured for a channel access procedure. The UE may select a candidate uplink grant for transmitting the uplink transmission based on an availability of one or more resource block sets of the selected candidate uplink grant. For example, the UE may perform a channel access procedure for the resource block sets indicated by the candidate uplink grants to determine the availability of each candidate uplink grant. The UE may transmit an uplink transmission to the base station using the one or more resource block sets indicated by the selected candidate uplink grant.

30 Claims, 17 Drawing Sheets

CANDIDATE UPLINK GRANTS FOR CHANNEL ACCESS

FIELD OF TECHNOLOGY

The following relates to wireless communications, including candidate uplink grants for channel access.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support candidate uplink grants for channel access. Generally, the described techniques provide for a base station to transmit control signaling including a candidate uplink grant configuration to a user equipment (UE). The candidate uplink grant configuration may include an indication of multiple candidate uplink grants for an uplink grant, each candidate uplink grant indicating one or more resource block sets configured for a channel access procedure. The UE may select a candidate uplink grant for transmitting the uplink transmission based on an availability of one or more resource block sets of the selected candidate uplink grant. For example, the UE may perform a channel access procedure (e.g., a listen before talk (LBT) procedure) for the resource block sets indicated by the candidate uplink grants to determine the availability of each candidate uplink grant. The UE may select a candidate uplink grant that indicates one or more available resource block sets by evaluating an order rule for the available resource block sets. In some examples, the UE may transmit an uplink transmission to the base station using the one or more resource block sets indicated by the selected candidate uplink grant.

A method for wireless communications at a UE is described. The method may include receiving control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band, selecting a candidate uplink grant of the set of multiple candidate uplink grants based on one or more resource block sets of the one or more first resource block sets corresponding to the candidate uplink grant being available for an uplink transmission, and transmitting the uplink transmission based on the selected candidate uplink grant.

An apparatus for wireless communications at a UE is described. The apparatus may include a processor, memory in electronic communication with the processor, and instructions stored in the memory. The instructions may be executable by the processor to cause the apparatus to receive control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band, select a candidate uplink grant of the set of multiple candidate uplink grants based on one or more resource block sets of the one or more first resource block sets corresponding to the candidate uplink grant being available for an uplink transmission, and transmit the uplink transmission based on the selected candidate uplink grant.

Another apparatus for wireless communications at a UE is described. The apparatus may include means for receiving control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band, means for selecting a candidate uplink grant of the set of multiple candidate uplink grants based on one or more resource block sets of the one or more first resource block sets corresponding to the candidate uplink grant being available for an uplink transmission, and means for transmitting the uplink transmission based on the selected candidate uplink grant.

A non-transitory computer-readable medium storing code for wireless communications at a UE is described. The code may include instructions executable by a processor to receive control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band, select a candidate uplink grant of the set of multiple candidate uplink grants based on one or more resource block sets of the one or more first resource block sets corresponding to the candidate uplink grant being available for an uplink transmission, and transmit the uplink transmission based on the selected candidate uplink grant.

In some examples of the method, apparatuses, and non-transitory computer-readable medium described herein, selecting the candidate uplink grant may include operations, features, means, or instructions for performing the channel access procedure for the one or more resource block sets of the one or more first resource block sets and determining the one or more resource block sets may be available for the uplink transmission based on the channel access procedure.

In some examples of the method, apparatuses, and non-transitory computer-readable medium described herein, receiving the control signaling may include operations, features, means, or instructions for receiving a first indication of the set of multiple candidate uplink grants.

Some examples of the method, apparatuses, and non-transitory computer-readable medium described herein may further include operations, features, means, or instructions for receiving a second indication of each candidate uplink grant of the set of multiple candidate uplink grants.

Some examples of the method, apparatuses, and non-transitory computer-readable medium described herein may further include operations, features, means, or instructions for receiving a second indication of a first candidate uplink grant of the set of multiple candidate uplink grants and receiving a third indication of a number of resource block sets including an offset between the first candidate uplink grant and an additional one or more candidate uplink grants of the set of multiple candidate uplink grants.

Some examples of the method, apparatuses, and non-transitory computer-readable medium described herein may further include operations, features, means, or instructions for transmitting, to a base station, a capability message indicating a capability of the UE to select a candidate uplink grant of the set of multiple candidate uplink grants, where receiving the control signaling may be based on the transmitted capability message.

In some examples of the method, apparatuses, and non-transitory computer-readable medium described herein, receiving the control signaling may include operations, features, means, or instructions for receiving first control signaling including an indication of a list of candidate uplink grants, a portion of the list of candidate uplink grants including the set of multiple candidate uplink grants and receiving second control signaling activating the set of multiple candidate uplink grants.

In some examples of the method, apparatuses, and non-transitory computer-readable medium described herein, selecting the candidate uplink grant may include operations, features, means, or instructions for evaluating an order rule associated with the set of multiple candidate uplink grants.

In some examples of the method, apparatuses, and non-transitory computer-readable medium described herein, the order rule may be based on an index of the one or more first resource block sets.

In some examples of the method, apparatuses, and non-transitory computer-readable medium described herein, the order rule may be based on a transmission rate of the uplink transmission.

A method for wireless communications at a base station is described. The method may include transmitting, to a UE, control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band and receiving an uplink transmission based on a selected candidate uplink grant.

An apparatus for wireless communications at a base station is described. The apparatus may include a processor, memory in electronic communication with the processor, and instructions stored in the memory. The instructions may be executable by the processor to cause the apparatus to transmit, to a UE, control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band and receive an uplink transmission based on a selected candidate uplink grant.

Another apparatus for wireless communications at a base station is described. The apparatus may include means for transmitting, to a UE, control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band and means for receiving an uplink transmission based on a selected candidate uplink grant.

A non-transitory computer-readable medium storing code for wireless communications at a base station is described. The code may include instructions executable by a processor to transmit, to a UE, control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band and receive an uplink transmission based on a selected candidate uplink grant.

In some examples of the method, apparatuses, and non-transitory computer-readable medium described herein, transmitting the control signaling may include operations, features, means, or instructions for transmitting a first indication of the set of multiple candidate uplink grants.

Some examples of the method, apparatuses, and non-transitory computer-readable medium described herein may further include operations, features, means, or instructions for transmitting a second indication of each candidate uplink grant of the set of multiple candidate uplink grants.

Some examples of the method, apparatuses, and non-transitory computer-readable medium described herein may further include operations, features, means, or instructions for transmitting a second indication of a first candidate uplink grant of the set of multiple candidate uplink grants and transmitting a third indication of a number of resource block sets including an offset between the first candidate uplink grant and an additional one or more candidate uplink grants of the set of multiple candidate uplink grants.

Some examples of the method, apparatuses, and non-transitory computer-readable medium described herein may further include operations, features, means, or instructions for receiving, from the UE, a capability message indicating a capability of the UE to select a candidate uplink grant of the set of multiple candidate uplink grants, where transmitting the control signaling may be based on the received capability message.

In some examples of the method, apparatuses, and non-transitory computer-readable medium described herein, transmitting the control signaling may include operations, features, means, or instructions for transmitting first control signaling including an indication of a list of candidate uplink grants, a portion of the list of candidate uplink grants including the set of multiple candidate uplink grants and transmitting second control signaling activating the set of multiple candidate uplink grants.

DETAILED DESCRIPTION

Figure 1:
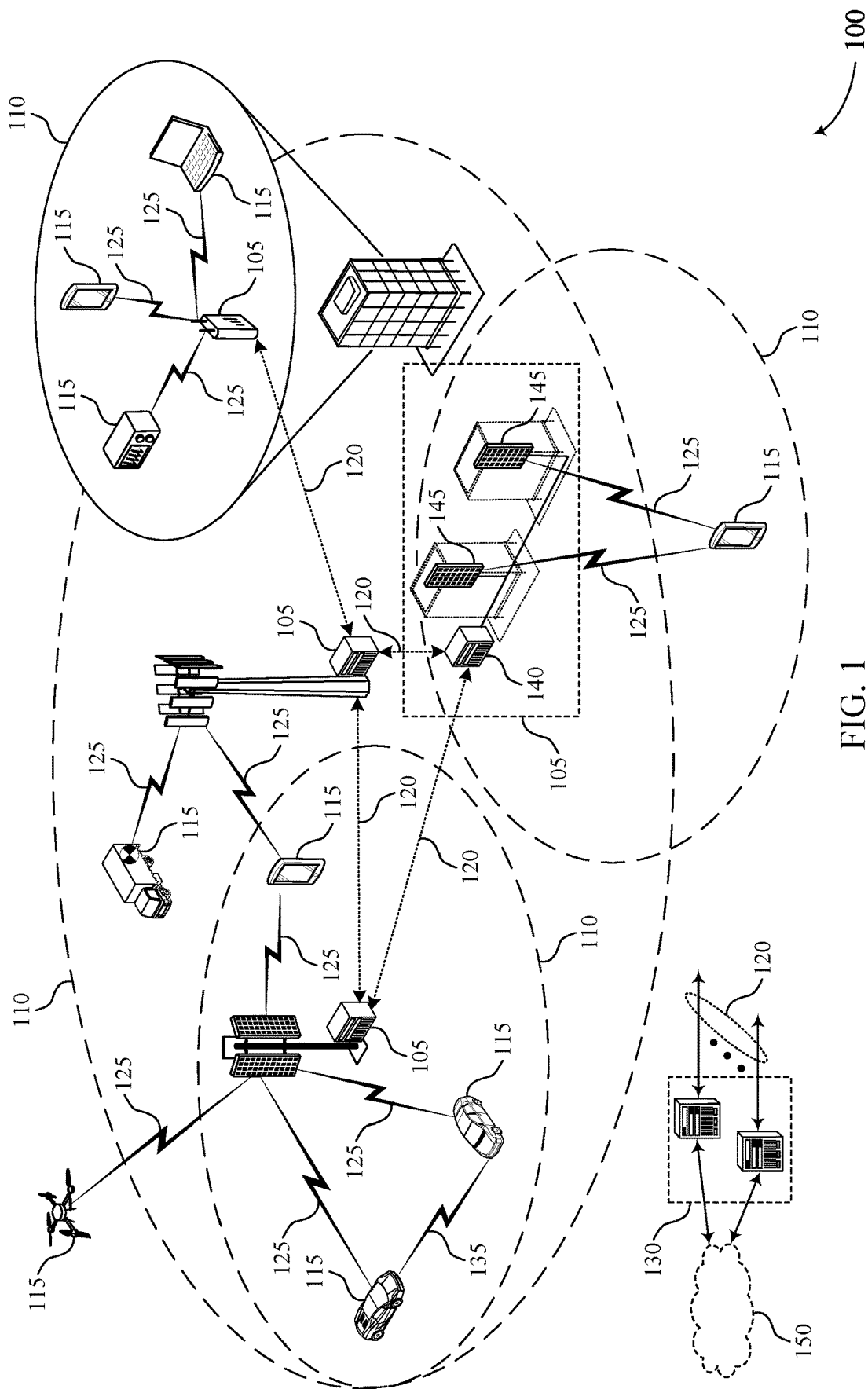
FIGS. 1 and 2 illustrate examples of wireless communications systems that support candidate uplink grants for channel access in accordance with aspects of the present disclosure.

In some wireless communications systems, a base station and a user equipment (UE) may operate in a shared radio frequency spectrum band e.g., (an unlicensed frequency spectrum band) that is shared by communication technologies (e.g., a new radio in unlicensed spectrums (NR-U) system, a Wi-Fi system, or the like) or wireless communications systems operators, or both. In some examples, the UE may receive an uplink grant from the base station indicating a resource block set, which may include one or more resources blocks, for an uplink transmission in the shared frequency spectrum band. The UE may perform a channel access procedure (e.g., an unlicensed channel access procedure), such as a listen before talk (LBT) procedure, over the one or more resource blocks to determine if a channel is available for the uplink transmission. For example, the UE may sense channel energy in a given frequency band, which may be referred to as an LBT bandwidth, including the one or more resource blocks. If the detected energy is less than a threshold, the channel and corresponding resource block set may be available for the uplink transmission. However, if the detected energy is greater than the threshold, the channel may be unavailable, and the UE may refrain from transmitting the uplink transmission during the resource blocks indicated in the uplink grant. Even if the UE is configured with additional resource block sets that may be available, the UE may wait for the one or more resource blocks indicated in the uplink grant to become available by performing additional LBT operations at a later time, which may cause delays as well as increase signaling overhead (e.g., if the UE receives an additional uplink grant for the uplink transmission).

As described herein, a UE may select a candidate uplink grant with one or more available resources block sets from multiple candidate uplink grants for an uplink transmission based on receiving a configuration for the candidate uplink grants from a base station. In some examples, the UE may receive control signaling, such as a downlink control information (DCI) message, radio resource control (RRC) signaling, or the like, from the base station including a configuration indicating multiple candidate uplink grants for an uplink grant, each candidate uplink grant corresponding to one or more resource block sets (e.g., the time-frequency resources indicated in the candidate uplink grant may overlap with time-frequency resources for a configured resource block set). In some cases, the control signaling may include a pointer to a frequency resource (e.g., a resource block) for each candidate uplink grant (e.g., based on an index of the one or more resource blocks indicated in the candidate uplink grant). In some cases, the control signaling may include a pointer to a first resource block for a candidate uplink grant and one or more resource block offsets from the first resource block for additional candidate uplink grants. In some examples, the UE may perform an unlicensed or shared channel access procedure (e.g., an LBT procedure) on the resource block sets corresponding to each candidate uplink grant to determine whether the resource block sets are available for an uplink transmission. The UE may select a candidate uplink grant for transmitting the uplink transmission based on evaluating an order rule. For example, the UE may select a candidate uplink grant based on the index of available resource block sets. In some other examples, the UE may combine candidate uplink grants to increase signaling reliability by transmitting the uplink transmission with increased redundancy. The UE may transmit the uplink transmission using the resource of the selected candidate uplink grant.

Aspects of the disclosure are initially described in the context of wireless communications systems. Aspects of the disclosure are further described in the context of a resource diagram and a process flow. Aspects of the disclosure are further illustrated by and described with reference to apparatus diagrams, system diagrams, and flowcharts that relate to candidate uplink grants for channel access.

FIG. 1 illustrates an example of a wireless communications system 100 that supports candidate uplink grants for channel access in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 and a base station 105 may operate in a shared radio frequency spectrum band (e.g., an unlicensed frequency spectrum band) that shares a spectrum between radio access technologies (e.g., an NR-U system, a Wi-Fi system, or the like) or between different wireless communications systems operators, or both. In some cases, a device or node operating in the unlicensed frequency spectrum band, such as the UE 115, may perform an unlicensed channel access procedure to determine whether one or more resources (e.g., frequency resources) are available for a transmission. For example, the UE 115 may perform an LBT procedure across one or more resource blocks that make up a frequency spectrum band, which may be referred to as an LBT bandwidth. The available resource blocks in each LBT bandwidth may be referred to as a resource block set. The size and spacing of the resource block sets may be configured by control signaling, and one or more resource block sets may be included in a bandwidth part.

In some cases, the UE 115 may receive an uplink grant indicating resources that overlaps with a resource block set to use for an uplink transmission to the base station 105. The UE 115 may perform an LBT procedure across the resource block set to verify that operation (e.g., receiving or transmitting) is not interrupted. If the channel is busy (e.g., based on energy detection exceeding a threshold for that resource block set), the UE 115 may refrain from transmitting using the resource block set and may perform an additional one or more LBT procedures at later times until the channel is available, which may cause delays as well as increase signaling overhead (e.g., if the UE 115 receives an additional uplink grant for the uplink transmission).

In some examples, a UE 115 may receive control signaling (e.g., a DCI message, RRC signaling, a MAC-CE, or the like from a base station 105) including a candidate uplink grant configuration. The candidate uplink grant configuration may include an indication of multiple candidate uplink grants for an uplink grant. The UE 115 may evaluate one or more of the candidate uplink grants to select a candidate uplink grant for transmitting the uplink transmission based on an availability of one or more resource block sets of the selected candidate uplink grant. For example, the UE 115 may perform a channel access procedure (e.g., an LBT procedure) for the resource block sets corresponding to the candidate uplink grants to determine the availability of the resource block sets for each candidate uplink grant. The UE 115 may select a candidate uplink grant that corresponds to one or more available resource block sets by evaluating an order rule for the available resource block sets. In some cases, the UE 115 may be configured with an order rule that specifies the candidate uplink grant based on an index of one or more available resource block sets of the candidate uplink grant (e.g., a smallest index, a largest index, or an index that may be otherwise indicated). Additionally or alternatively, the UE 115 may combine candidate uplink grants for an uplink transmission with a lower transmission rate by using a lower modulation and coding scheme (MCS) to increase signaling reliability (e.g., by increasing transmission redundancy). In some examples, the UE 115 may transmit the uplink transmission to the base station 105 using one or more resource block sets corresponding to the selected candidate uplink grant.

Figure 2:
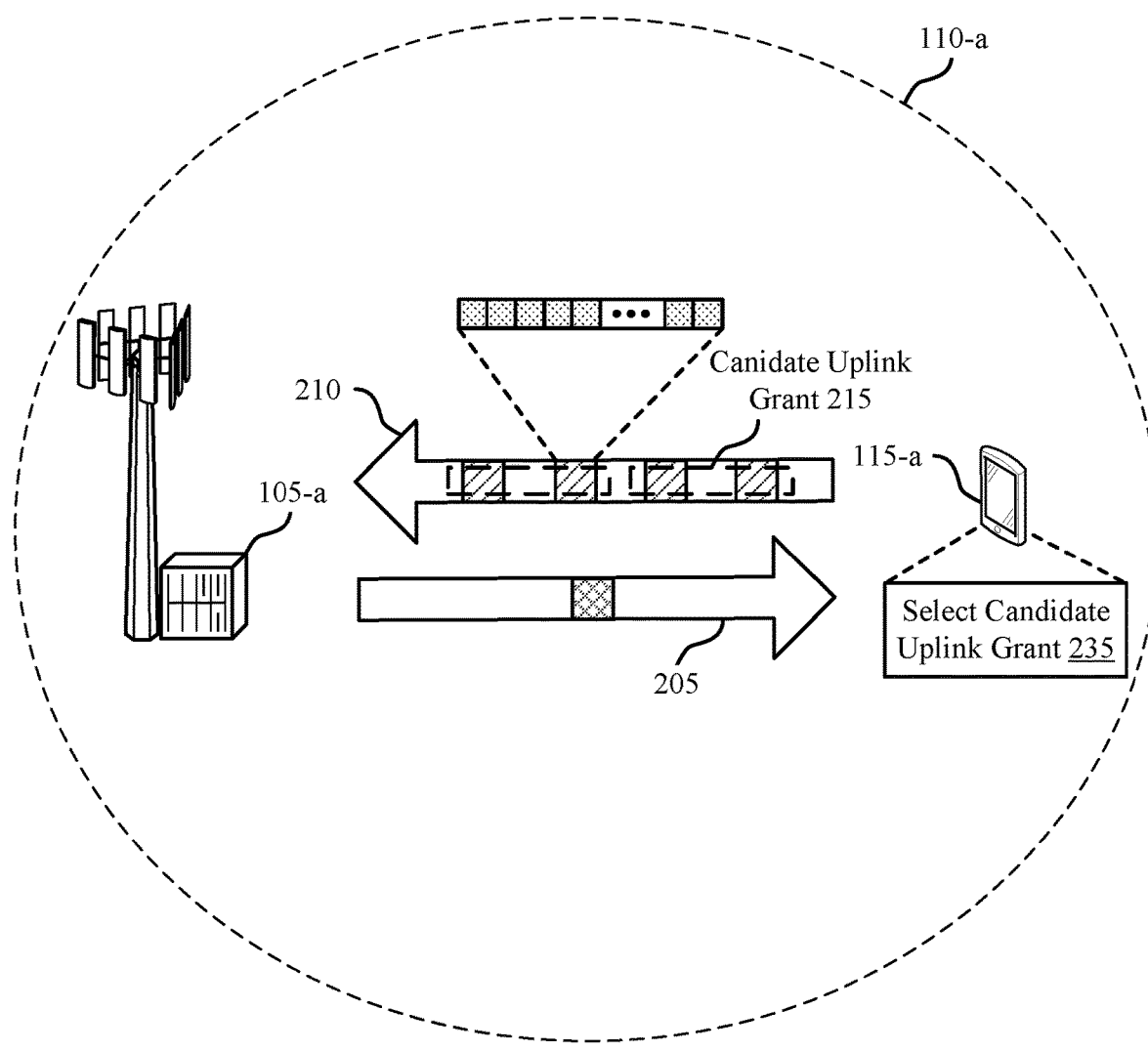

FIG. 2 illustrates an example of a wireless communications system 200 that supports candidate uplink grants for channel access in accordance with aspects of the present disclosure. In some examples, the wireless communications system 200 may implement aspects of the wireless communications system 100 and may include UE 115-*a* and base station 105-*a* with coverage area 110-*a*, which may be examples of a UE 115 and a base station 105 with a coverage area 110 as described with reference to FIG. 1. In some cases, UE 115-*a* may communicate with base station 105-*a* by receiving control signaling or data via downlink communication link 205, transmitting control signaling or data via uplink communication link 210, or both. For example, UE 115-a may receive a configuration indicating multiple candidate uplink grants 215 for an uplink grant from base station 105-a via downlink communication link 205 and may select an available candidate uplink grant 215 for an uplink transmission to base station 105-a via uplink communication link 210.

In some examples, the UE 115-a and the base station 105-a may operate in a shared radio frequency spectrum band (e.g., an unlicensed frequency spectrum band) that shares a spectrum with other radio access technologies (e.g., an NR-U system, a Wi-Fi system, or the like) or between wireless communication systems, or both. For example, UE 115-a and base station 105-a may communicate using the NR-U system, which may share a frequency spectrum band (e.g., the 5 GHz and 6 GHz band) with the Wi-Fi system. In some cases, a device or node operating in the unlicensed frequency spectrum band, such as the UE 115-a, may perform an unlicensed channel access procedure to determine whether one or more resources (e.g., frequency resources) are available for a transmission. For example, the UE 115-a may perform an LBT procedure across one or more resource blocks 220 that make up a frequency spectrum band (e.g., using 20 megahertz (MHz) as a basic channel access unit for the NR-U system, the Wi-Fi system, or both), which may be referred to as an LBT bandwidth or a resource block set 225.

A bandwidth part (e.g., a BWP configured for UE 115-a) of the unlicensed frequency band may include one or more resource block sets 225. The resource block set 225 may be derived separately for downlink and uplink based on control signaling (e.g., intra-cell guard band signaling). For example, the UE 115-a may receive control signaling from the base station 105-a, such as RRC signaling, including an intra-cell guard band configuration, which may specify the frequency between each resource block set 225 in a BWP (e.g., referred to as a guard band). The intra-cell guard band configuration may include one or more parameters, such as a parameter for transmitting an uplink transmission (e.g., intraCellGuardBandUL), a parameter for receiving a downlink transmission (e.g., intraCellGuardBandDL), or both. In some cases, such as when the UE 115-a or the base station 105-a is performing an all or nothing transmission, the guard band may have a value of zero.

In some examples, the UE 115-a may receive an uplink grant from the base station 105-a. The uplink grant may indicate resources that overlap with or otherwise correspond to a resource block set 225 with one or more resource blocks 220 to use for an uplink transmission to the base station 105-a. The UE 115-a may perform an LBT procedure across the resource block set(s) 225 corresponding to the uplink grant to verify that operation (e.g., receiving or transmitting) is not interrupted. For example, the UE 115-a may sense a channel energy by detecting energy in the LBT bandwidth (e.g., the resource block set 225). If the detected energy is less than a threshold, the channel is available. The UE 115-a may use the channel for a transmission. If the detected energy is greater than the threshold, the channel is unavailable. In some examples, the base station 105-a may configure the UE 115-a with the threshold via RRC signaling, a MAC-CE, a DCI message or some other control signaling. In some other examples, the UE 115-a may otherwise determine the threshold (e.g., based on a predetermined value at the UE 115-a). If the channel is busy, the UE 115-a may refrain from transmitting using the resource block set 225 corresponding to the uplink grant even if resource block sets 225 other than those corresponding to the uplink grant are available for the uplink transmission (e.g., the uplink grant may have corresponded to two resource block sets 225 of a BWP that were unavailable, but the UE 115-a may have had two other resource block sets 225 in the BWP that were available). The UE 115-a may perform an additional one or more LBT procedures at later times until the channel is available, which may cause delays as well as increase signaling overhead (e.g., if the UE 115 receives an additional uplink grant for the uplink transmission).

In some examples, the UE 115-a may receive control signaling (e.g., a DCI message, RRC signaling, a MAC-CE, or the like from the base station 105-a) including a candidate uplink grant configuration 230. The candidate uplink grant configuration 230 may include an indication of multiple candidate uplink grants 215 for an uplink grant, such that the UE 115-a may select among the candidate uplink grants 215 for an uplink transmission, which may improve the chances of the UE 115-a finding an available resource for the uplink grant. For example, UE 115-a may receive the candidate uplink grant configuration 230 in a DCI message from base station 105-a via downlink communication link 205. The DCI message may include one or more extra bits indicating the candidate uplink grants 215. In some cases, the candidate uplink grant configuration 230 may include a pointer to one or more resource blocks 220 or resource block sets 225 for one or more candidate uplink grants 215, which is described in further detail with respect to FIG. 3. In some cases, UE 115-a may transmit a capability message to base station 105-a indicating a capability of UE 115-a to support multiple candidate uplink grants 215 for an uplink grant. In some examples, UE 115-a may be configured with the multiple candidate uplink grants 215 (e.g., via RRC signaling) prior to receiving the DCI message. The DCI message may indicate (e.g., activate) which of the one or more configured candidate uplink grants 215 for UE 115-a to select.

At 235, UE 115-a may select a candidate uplink grant 215 for transmitting the uplink transmission based on an availability of one or more resource block sets 225 corresponding to the selected candidate uplink grant 215. For example, UE 115-a may perform a channel access procedure (e.g., an LBT procedure) for the resource block sets 225 corresponding to the candidate uplink grants 215 to determine the availability of the resources associated with each candidate uplink grant 215. UE 115-a may select a candidate uplink grant 215 that corresponds with one or more available resource block sets 225 by evaluating an order rule. In some cases, UE 115-a may be configured with an order rule that specifies the candidate uplink grant 215 based on an index of one or more available resource block sets 225 of the candidate uplink grant 215 (e.g., a smallest index, a largest index, or an index that may be otherwise indicated). For example, UE 115-a may transmit the uplink transmission over the resource block sets 225 for a candidate uplink grant 215 with a smallest index in resource block sets 225 that are available for transmission based on the channel access procedure. Additionally or alternatively, UE 115-a may combine candidate uplink grants 215 for an uplink transmission with a lower transmission rate by using a lower MCS to increase signaling reliability (e.g., by increasing transmission redundancy). In some examples, UE 115-a may transmit an uplink transmission to base station 105-a using one or more resource block sets 225 indicated by the selected candidate uplink grant 215.

Figure 3:
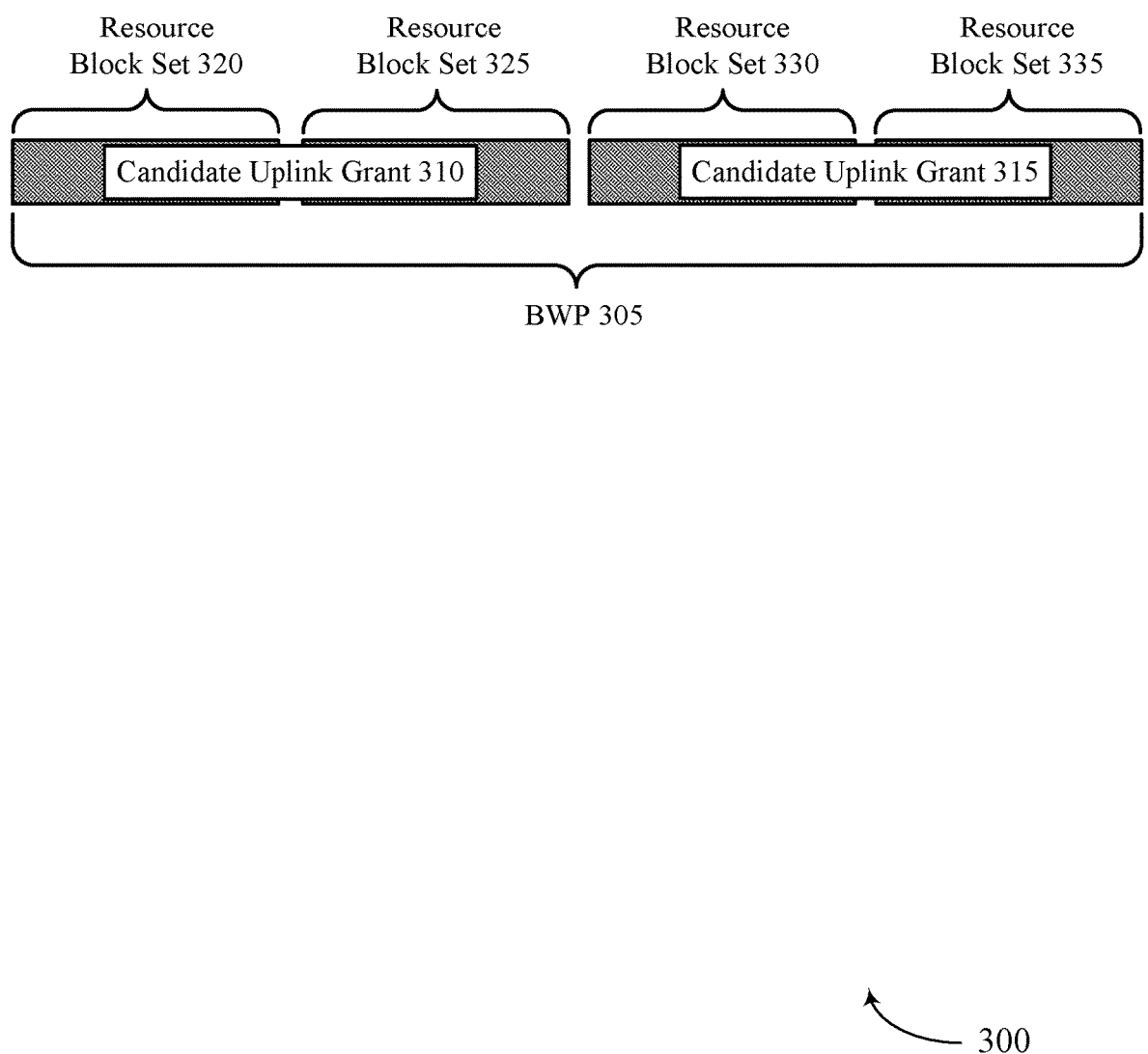
FIG. 3 illustrates an example of a resource diagram that supports candidate uplink grants for channel access in accordance with aspects of the present disclosure.

FIG. 3 illustrates an example of a resource diagram 300 that supports candidate uplink grants for channel access in accordance with aspects of the present disclosure. In some examples, resource diagram 300 may implement aspects of wireless communication system 100, wireless communications system 200, or both. For example, resource diagram 300 may be implemented by a UE 115 or a base station 105, as described with reference to FIGS. 1 and 2. In some cases, a UE 115 may receive a candidate uplink grant configuration (e.g., for one or more candidate uplink grants in a BWP 305, such as candidate uplink grant 310 and candidate uplink grant 315) in control signaling from a base station 105. The candidate uplink grant configuration may include a pointer to one or more resource block sets for the one or more candidate uplink grants.

In some examples, a UE 115 may receive control signaling from a base station 105 including scheduling information for an uplink transmission. For example, the UE 115 may receive a DCI message including a configuration indicating one or more candidate uplink grants in a BWP 305, such as candidate uplink grant 310, candidate uplink grant 315, or both, for an uplink grant. That is, multiple candidate uplink grants may correspond to a single uplink grant such that the UE 115 may evaluate multiple uplink grant candidates to select an uplink grant candidate for the uplink grant. The configuration may be referred to as a candidate uplink grant configuration and may include one or more bits indicating the candidate uplink grants. The candidate uplink grants may indicate frequency resources that correspond to one or more resource block sets. For example, candidate uplink grant 310 may indicate frequency resources that overlap with or otherwise correspond to resource block set 320, resource block set 325, or both, while candidate uplink grant 315 may indicate frequency resources that overlap with or otherwise correspond to resource block set 330, resource block set 335, or both.

In some cases, the candidate uplink grant configuration may include a pointer or some other explicit indication to one or more resource blocks for each candidate uplink grant. For example, the pointer may include an index of a first resource block (or some other frequency index) for each candidate uplink grant. Additionally or alternatively, the candidate uplink grant configuration may include a field that indicates the resources for different candidate uplink grants, such as a frequency domain resource allocation (FDRA) field. For example, the candidate uplink grant configuration may include an FDRA field indicating the resources for candidate uplink grant 310, an FDRA field indicating the resources for candidate uplink grant 315, or both.

In some other cases, the candidate uplink grant configuration may include a pointer or some other explicit indication to a first resource block (or other frequency index) for a candidate uplink grant as well as an indication of one or more resource block offsets from the first resource block for additional candidate uplink grants. For example, the UE 115 may receive an indication of a resource block (e.g., falling with resource block set 320) for candidate uplink grant 310, which may be the first candidate uplink grant for which the UE 115 performs an unlicensed channel access procedure (e.g., an LBT procedure). Additionally, the UE 115 may receive an indication of the number of resource blocks between the first resource block for candidate uplink grant 310 and any other first resource blocks for additional candidate uplink grants, such as an indication of one resource blocks between candidate uplink grant 310 and candidate uplink grant 315. The UE 115 may receive an FDRA field in control signaling that indicates the resource blocks for the candidate uplink grant 310. In some examples, the base station 105 may transmit RRC signaling that may configure the granularity of the offset between the first resource block for the candidate uplink grant and any additional candidate uplink grants. For example, the offset may be a set number of resource blocks or may vary based on a value indicated in the candidate uplink grant configuration or in additional control signaling.

Figure 4:
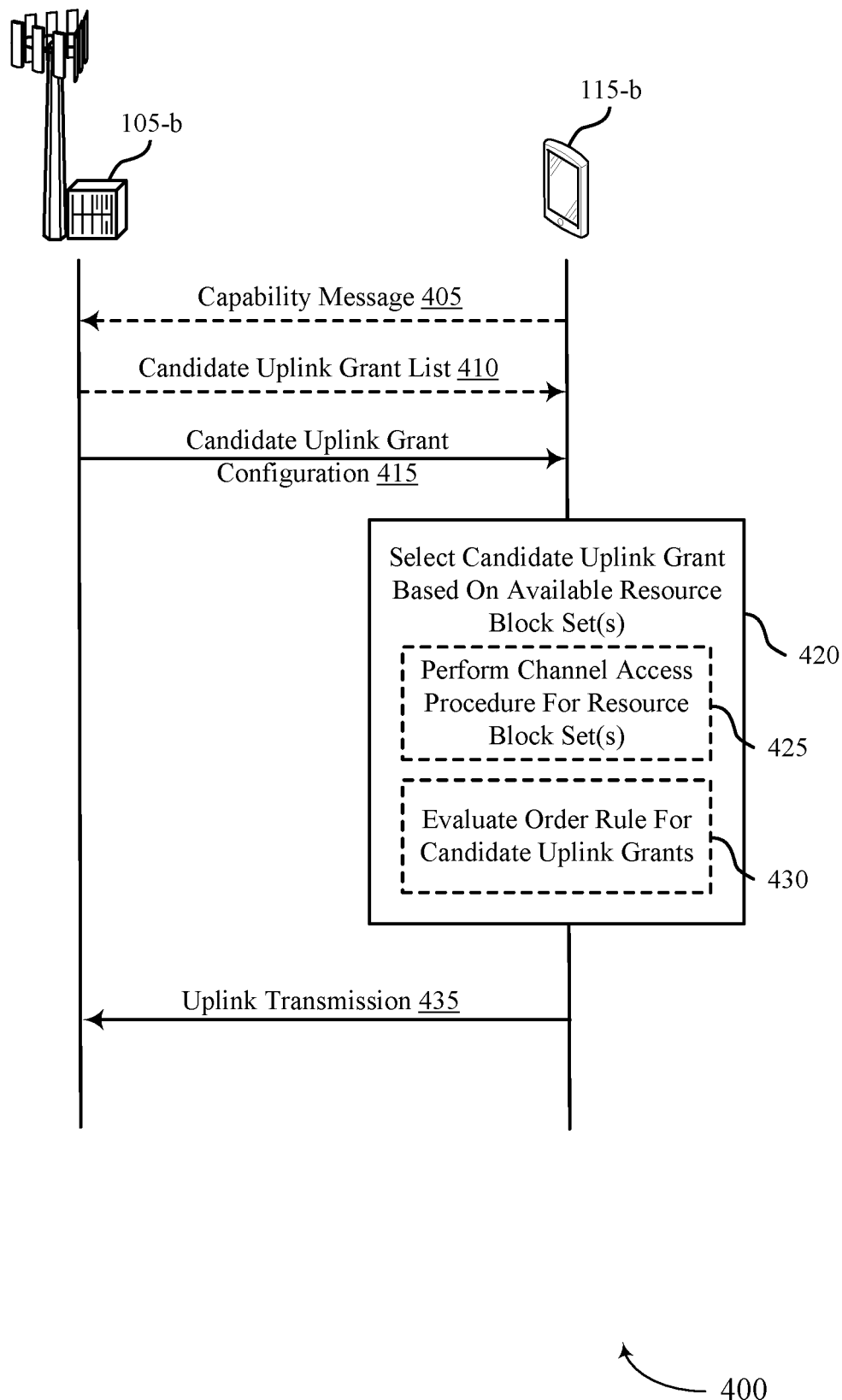
FIG. 4 illustrates an example of a process flow that supports candidate uplink grants for channel access in accordance with aspects of the present disclosure.

FIG. 4 illustrates an example of a process flow 400 that supports candidate uplink grants for channel access in accordance with aspects of the present disclosure. In some examples, process flow 400 may implement aspects of wireless communications system 100, wireless communications system 200, resource diagram 300, or a combination. The process flow 400 may illustrate an example of a base station 105, such as base station 105-b, transmitting control signaling including a configuration for multiple candidate uplink grants for an uplink grant to a UE 115, such as UE 115-b. The UE 115-b may select a candidate uplink grant for an uplink transmission to the base station 105-b. Alternative examples of the following may be implemented, where some processes are performed in a different order than described or are not performed. In some cases, processes may include additional features not mentioned below, or further processes may be added.

At 405, UE 115-b may transmit a capability message to base station 105-b (e.g., via control signaling). In some cases, the capability message may indicate a capability of UE 115-b to select a candidate uplink grant from multiple candidate uplink grants.

At 410, UE 115-b may receive control signaling, such as RRC signaling, indicating a list of candidate uplink grants.

At 415, UE 115-b may receive a candidate uplink grant configuration from base station 105-b. In some examples, base station 105-b may transmit the candidate uplink grant configuration in control signaling, such as a DCI message (e.g., including one or more extra bits to indicate candidate uplink grants), based on receiving the capability message at 405. The candidate uplink grant configuration may indicate multiple candidate uplink grants, each corresponding to one or more resource block sets configured for a channel access procedure for a shared radio frequency spectrum band (e.g., an unlicensed band or a band shared between radio access technologies or operators). For example, each candidate uplink grant may indicate resources that overlap with or otherwise correspond to resources of a resource block set or LBT bandwidth. In some examples, the candidate uplink grant configuration may indicate one or more candidate uplink grants from the list of candidate uplink grants received at 410 (e.g., through explicit signaling such as an index). In some examples, one or more candidate uplink grants that have been preconfigured may be activated based on receiving the candidate uplink grant configuration.

In some cases, UE 115-b may receive an indication of the multiple candidate uplink grants in the candidate uplink grant configuration. For example, the candidate uplink grant configuration may include an indication of each candidate uplink grant independently. In some other examples, the candidate uplink grant configuration may include an indication of a first candidate uplink grant and an offset between the first candidate uplink grant and one or more additional candidate uplink grants.

At 420, UE 115-b may select a candidate uplink grant from the multiple candidate uplink grants indicated in the candidate uplink grant configuration. UE 115-b may select a candidate uplink grant based on one or more resource block sets corresponding to the selected candidate uplink grant being available for an uplink transmission.

For example, at 425, UE 115-*b* may perform the channel access procedure for one or more resource block sets. In some examples, the channel access procedure may be an LBT procedure in which UE 115-*b* senses a channel energy across each resource block set of the candidate uplink grants. UE 115-*b* may determine one or more resource block sets are available for the uplink transmission based on the channel access procedure (e.g., based on the sensed channel energy satisfying a threshold value). In some examples, if the resource block sets corresponding to a first candidate uplink grant are unavailable, the UE 115-*b* may then evaluate the resource block sets corresponding to a second candidate uplink grant, and this process may continue based on the number of candidate uplink grants. The order in which the UE 115-*b* evaluates the candidate uplink grants may be determined by an order rule as discussed below.

At 430, UE 115-*b* may evaluate an order rule for the multiple candidate uplink grants. For example, the order rule may be based on an index of the available resource block sets. That is, the UE 115-*b* may select a candidate uplink grant indicating an available resource block set with the smallest index, largest index, or the like. In some other examples, the order rule may be based on a transmission rate of the uplink transmission. If the uplink transmission has a relatively low transmission rate, UE 115-*b* may combine one or more candidate uplink grants with available resource block sets to transmit the uplink transmission.

At 435, UE 115-*b* may transmit an uplink transmission to base station 105-*b* based on selecting the candidate uplink grant. For example, UE 115-*b* may use one or more resources (e.g., frequency resources) indicated in the selected candidate uplink grant to transmit the uplink transmission.

Figure 5:
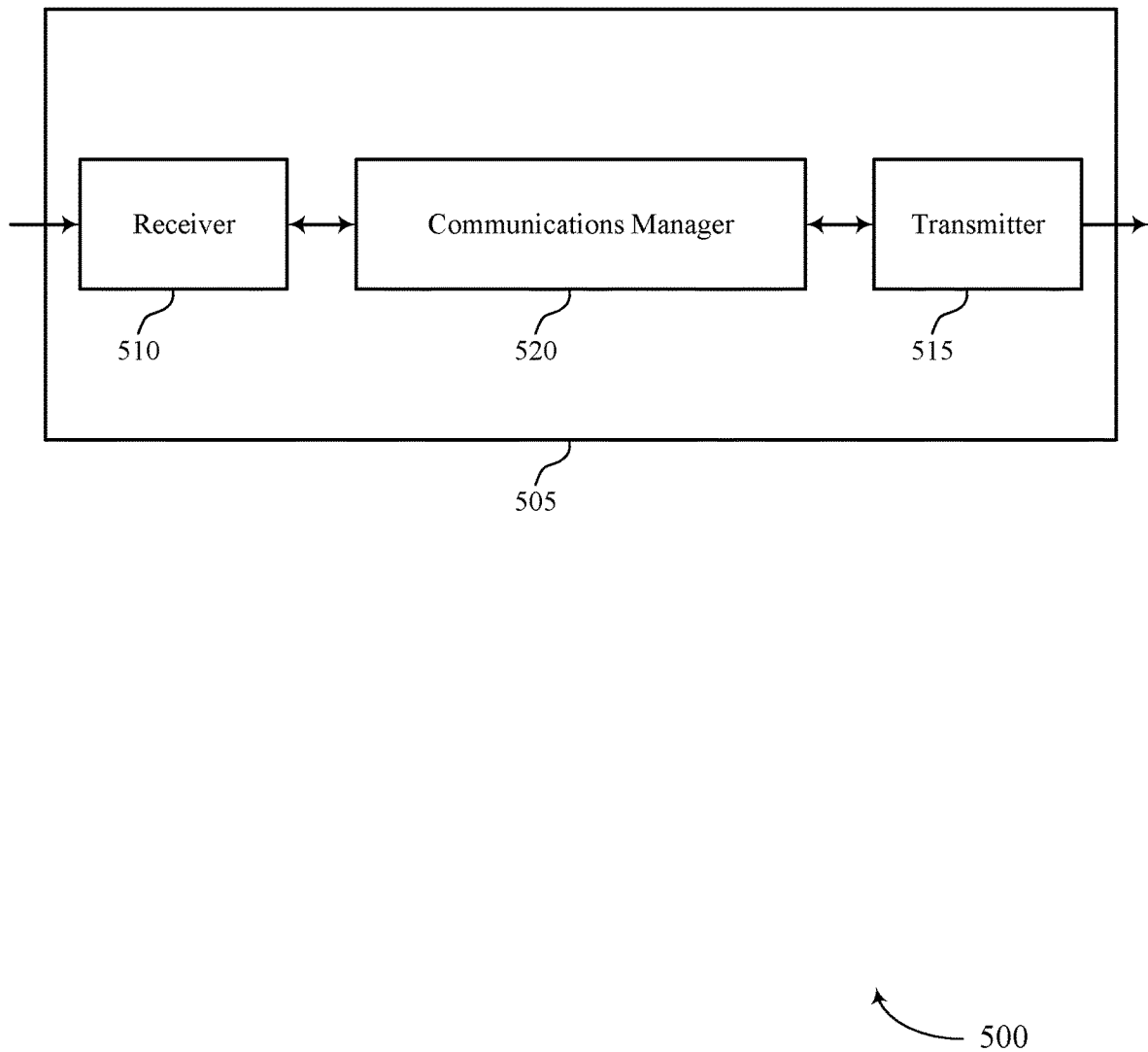
FIGS. 5 and 6 show block diagrams of devices that support candidate uplink grants for channel access in accordance with aspects of the present disclosure.

FIG. 5 shows a block diagram 500 of a device 505 that supports candidate uplink grants for channel access in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to candidate uplink grants for channel access). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to candidate uplink grants for channel access). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of candidate uplink grants for channel access as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band. The communications manager 520 may be configured as or otherwise support a means for selecting a candidate uplink grant of the set of multiple candidate uplink grants based on one or more resource block sets of the first resource block sets corresponding to the candidate uplink grant being available for an uplink transmission. The communications manager 520 may be configured as or otherwise support a means for transmitting the uplink transmission based on the selected candidate uplink grant.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for a base station to configure the UE with multiple candidate uplink grants for an uplink grant, which may result in more efficient utilization of communication resources based on the UE selecting a candidate uplink grant with available resource block sets.

Figure 6:
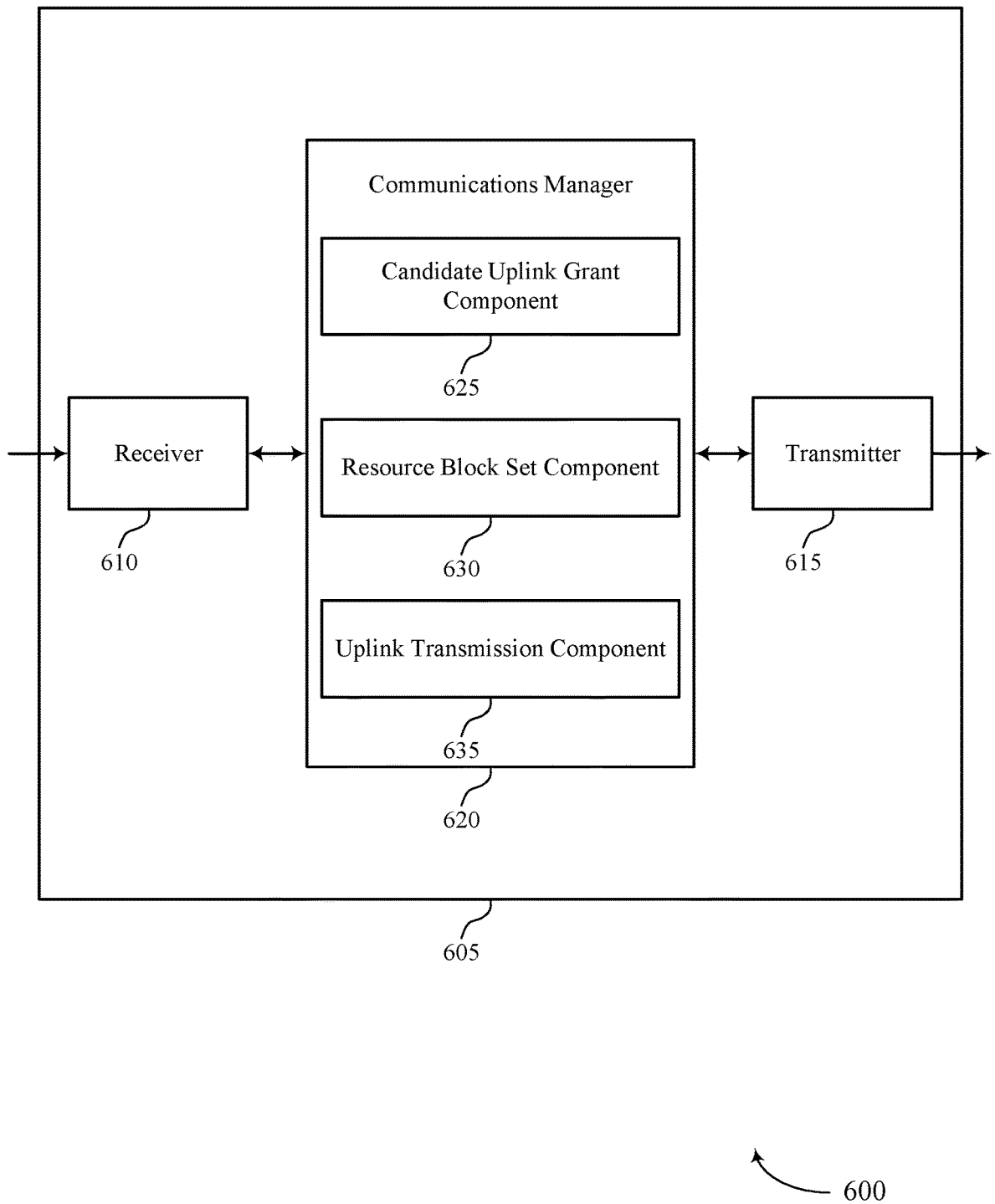

FIG. 6 shows a block diagram 600 of a device 605 that supports candidate uplink grants for channel access in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to candidate uplink grants for channel access). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to candidate uplink grants for channel access). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of candidate uplink grants for channel access as described herein. For example, the communications manager 620 may include a candidate uplink grant component 625, a resource block set component 630, an uplink transmission component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The candidate uplink grant component 625 may be configured as or otherwise support a means for receiving control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band. The resource block set component 630 may be configured as or otherwise support a means for selecting a candidate uplink grant of the set of multiple candidate uplink grants based on one or more resource block sets of the first resource block sets corresponding to the candidate uplink grant being available for an uplink transmission. The uplink transmission component 635 may be configured as or otherwise support a means for transmitting the uplink transmission based on the selected candidate uplink grant.

Figure 7:
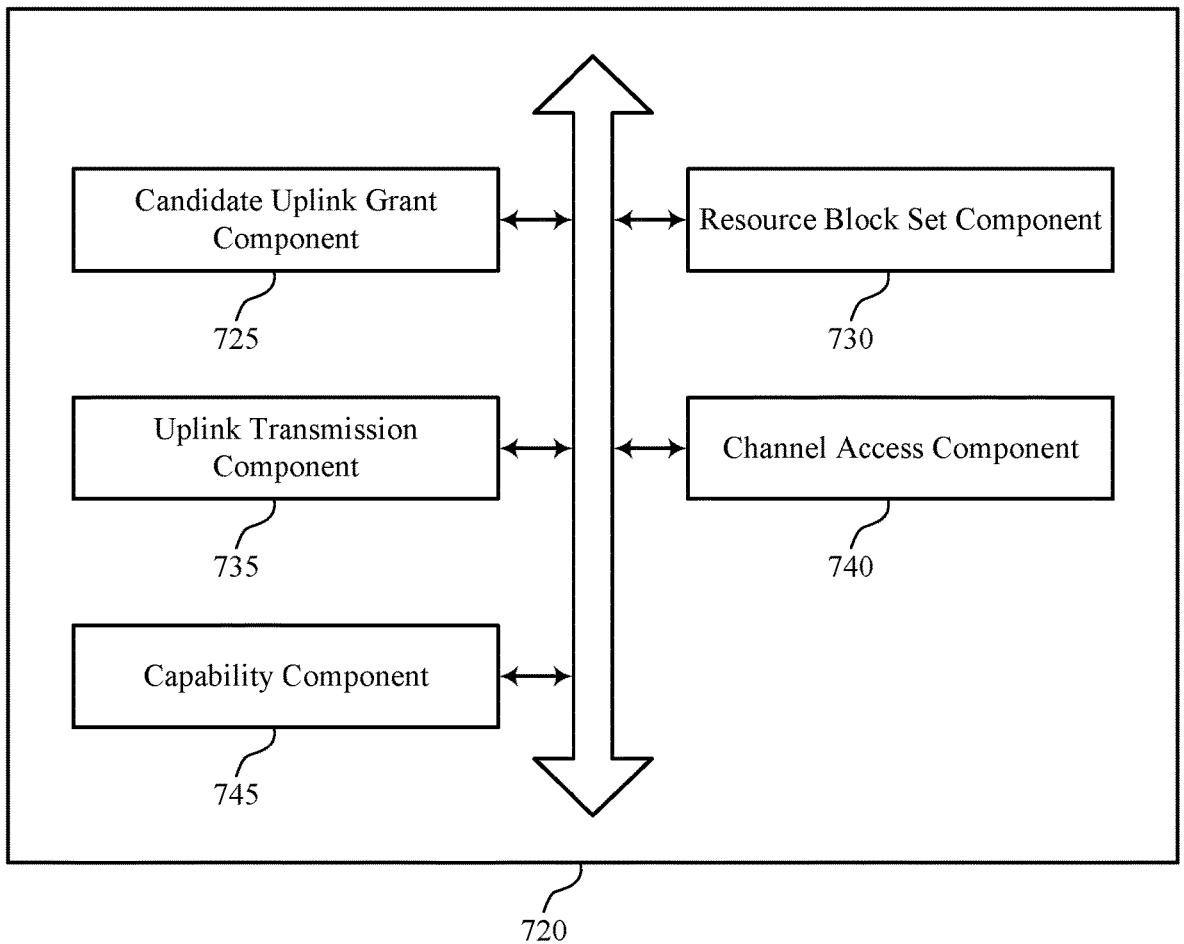
FIG. 7 shows a block diagram of a communications manager that supports candidate uplink grants for channel access in accordance with aspects of the present disclosure.

FIG. 7 shows a block diagram 700 of a communications manager 720 that supports candidate uplink grants for channel access in accordance with aspects of the present disclosure. The communications manager 720 may be an example of aspects of a communications manager 520, a communications manager 620, or both, as described herein. The communications manager 720, or various components thereof, may be an example of means for performing various aspects of candidate uplink grants for channel access as described herein. For example, the communications manager 720 may include a candidate uplink grant component 725, a resource block set component 730, an uplink transmission component 735, a channel access component 740, a capability component 745, or any combination thereof. Each of these components may communicate, directly or indirectly, with one another (e.g., via one or more buses).

The communications manager 720 may support wireless communications at a UE in accordance with examples as disclosed herein. The candidate uplink grant component 725 may be configured as or otherwise support a means for receiving control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band. The resource block set component 730 may be configured as or otherwise support a means for selecting a candidate uplink grant of the set of multiple candidate uplink grants based on one or more resource block sets of the first resource block sets corresponding to the candidate uplink grant being available for an uplink transmission. The uplink transmission component 735 may be configured as or otherwise support a means for transmitting the uplink transmission based on the selected candidate uplink grant.

In some examples, to support selecting the candidate uplink grant, the channel access component 740 may be configured as or otherwise support a means for performing the channel access procedure for the one or more resource block sets of the first resource block sets. In some examples, to support selecting the candidate uplink grant, the channel access component 740 may be configured as or otherwise support a means for determining the one or more resource block sets are available for the uplink transmission based on the channel access procedure.

In some examples, to support receiving the control signaling, the candidate uplink grant component 725 may be configured as or otherwise support a means for receiving a first indication of the set of multiple candidate uplink grants. In some examples, the candidate uplink grant component 725 may be configured as or otherwise support a means for receiving a second indication of each candidate uplink grant of the set of multiple candidate uplink grants. In some examples, the candidate uplink grant component 725 may be configured as or otherwise support a means for receiving a second indication of a first candidate uplink grant of the set of multiple candidate uplink grants. In some examples, the candidate uplink grant component 725 may be configured as or otherwise support a means for receiving a third indication of a number of resource block sets including an offset between the first candidate uplink grant and an additional one or more candidate uplink grants of the set of multiple candidate uplink grants.

In some examples, the capability component 745 may be configured as or otherwise support a means for transmitting, to a base station, a capability message indicating a capability of the UE to select a candidate uplink grant of the set of multiple candidate uplink grants, where receiving the control signaling is based on the transmitted capability message.

In some examples, to support receiving the control signaling, the candidate uplink grant component 725 may be configured as or otherwise support a means for receiving first control signaling including an indication of a list of candidate uplink grants, a portion of the list of candidate uplink grants including the set of multiple candidate uplink grants. In some examples, to support receiving the control signaling, the candidate uplink grant component 725 may be configured as or otherwise support a means for receiving second control signaling activating the set of multiple candidate uplink grants.

In some examples, to support selecting the candidate uplink grant, the uplink transmission component 735 may be configured as or otherwise support a means for evaluating an order rule associated with the set of multiple candidate uplink grants. In some examples, the order rule is based on an index of the one or more first resource block sets. In some examples, the order rule is based on a transmission rate of the uplink transmission.

Figure 8:
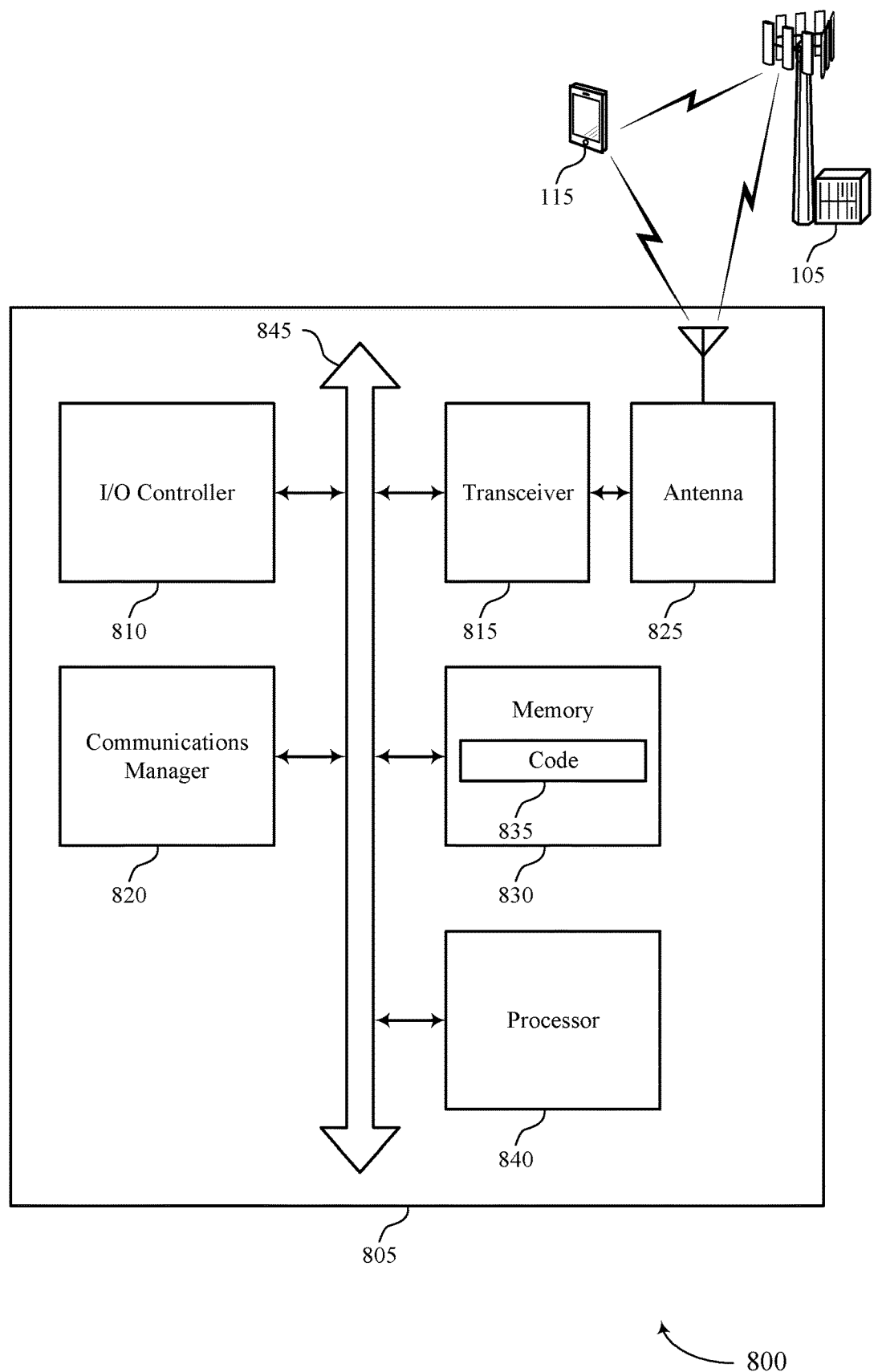
FIG. 8 shows a diagram of a system including a device that supports candidate uplink grants for channel access in accordance with aspects of the present disclosure.

FIG. 8 shows a diagram of a system 800 including a device 805 that supports candidate uplink grants for channel access in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting candidate uplink grants for channel access). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band. The communications manager 820 may be configured as or otherwise support a means for selecting a candidate uplink grant of the set of multiple candidate uplink grants based on one or more resource block sets of the first resource block sets corresponding to the candidate uplink grant being available for an uplink transmission. The communications manager 820 may be configured as or otherwise support a means for transmitting the uplink transmission based on the selected candidate uplink grant.

By including or configuring the communications manager 820 in accordance with examples as described herein, the device 805 may support techniques for a base station to configure a UE with multiple candidate uplink grants for an uplink grant, which may result in reduced latency, more efficient utilization of communication resources, improved utilization of processing capability based on the UE selecting a candidate uplink grant that indicates available resource block sets for an uplink transmission.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of candidate uplink grants for channel access as described herein, or the processor 840 and the memory 830 may be otherwise configured to perform or support such operations.

Figure 9:
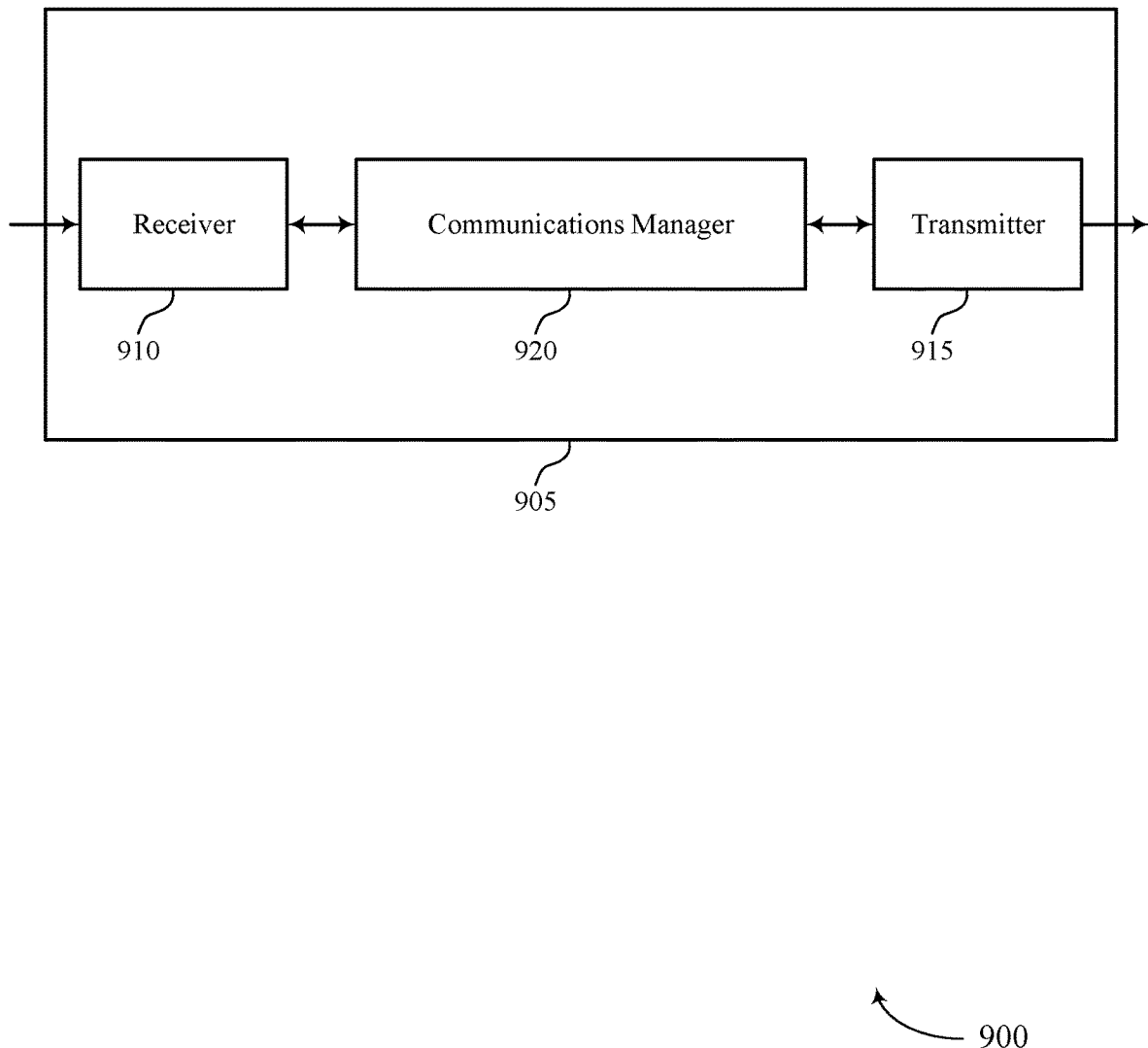
FIGS. 9 and 10 show block diagrams of devices that support candidate uplink grants for channel access in accordance with aspects of the present disclosure.

FIG. 9 shows a block diagram 900 of a device 905 that supports candidate uplink grants for channel access in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to candidate uplink grants for channel access). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to candidate uplink grants for channel access). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of candidate uplink grants for channel access as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band. The communications manager 920 may be configured as or otherwise support a means for receiving an uplink transmission based on a selected candidate uplink grant.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for a base station to configure a UE with multiple candidate uplink grants for an uplink grant, which may result in more efficient utilization of communication resources based on the UE selecting a candidate uplink grant with available resource block sets.

Figure 10:
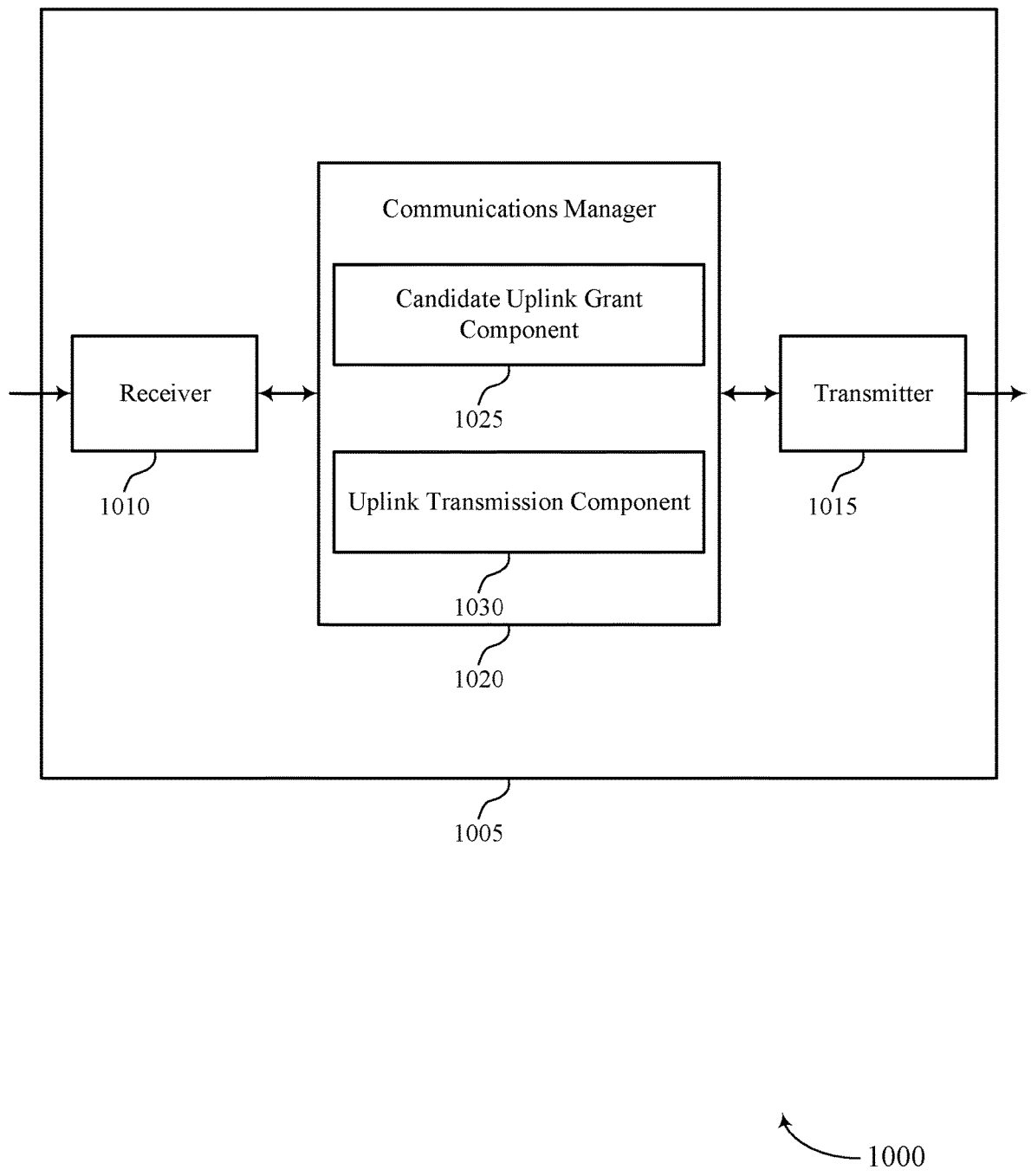

FIG. 10 shows a block diagram 1000 of a device 1005 that supports candidate uplink grants for channel access in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to candidate uplink grants for channel access). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to candidate uplink grants for channel access). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of candidate uplink grants for channel access as described herein. For example, the communications manager 1020 may include a candidate uplink grant component 1025 an uplink transmission component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The candidate uplink grant component 1025 may be configured as or otherwise support a means for transmitting, to a UE, control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band. The uplink transmission component 1030 may be configured as or otherwise support a means for receiving an uplink transmission based on a selected candidate uplink grant.

Figure 11:
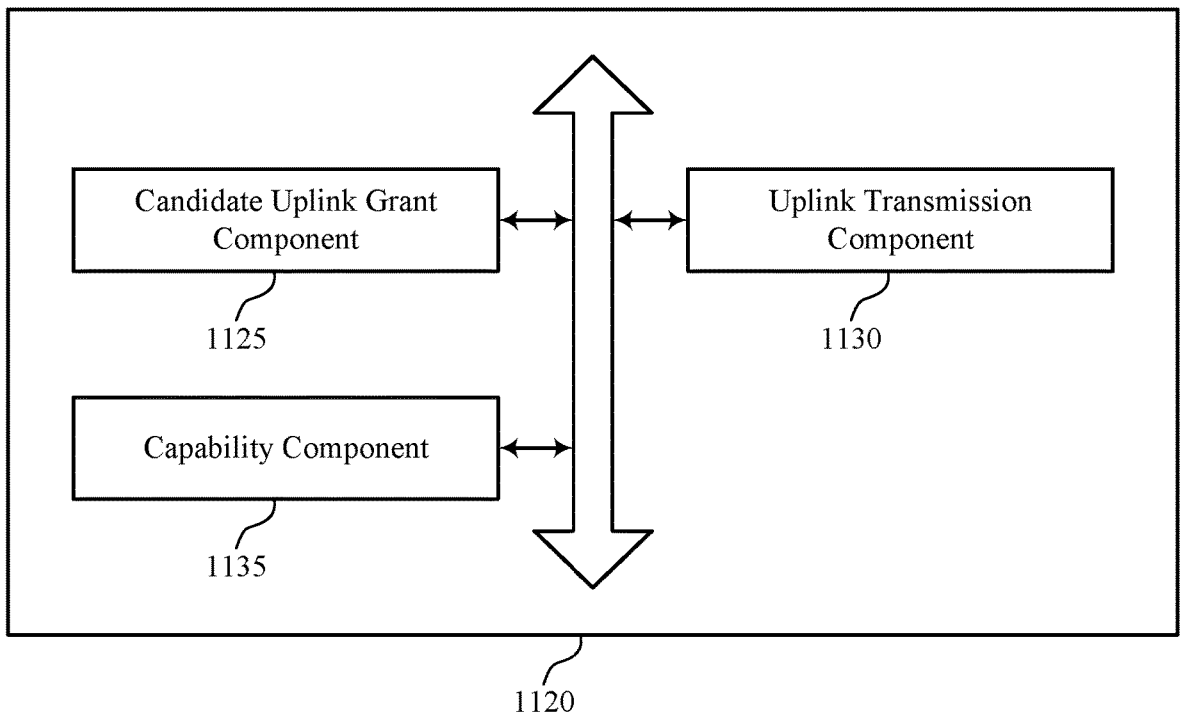
FIG. 11 shows a block diagram of a communications manager that supports candidate uplink grants for channel access in accordance with aspects of the present disclosure.

FIG. 11 shows a block diagram 1100 of a communications manager 1120 that supports candidate uplink grants for channel access in accordance with aspects of the present disclosure. The communications manager 1120 may be an example of aspects of a communications manager 920, a communications manager 1020, or both, as described herein. The communications manager 1120, or various components thereof, may be an example of means for performing various aspects of candidate uplink grants for channel access as described herein. For example, the communications manager 1120 may include a candidate uplink grant component 1125, an uplink transmission component 1130, a capability component 1135, or any combination thereof. Each of these components may communicate, directly or indirectly, with one another (e.g., via one or more buses).

The communications manager 1120 may support wireless communications at a base station in accordance with examples as disclosed herein. The candidate uplink grant component 1125 may be configured as or otherwise support a means for transmitting, to a UE, control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band. The uplink transmission component 1130 may be configured as or otherwise support a means for receiving an uplink transmission based on a selected candidate uplink grant.

In some examples, to support transmitting the control signaling, the candidate uplink grant component 1125 may be configured as or otherwise support a means for transmitting a first indication of the set of multiple candidate uplink grants. In some examples, the candidate uplink grant component 1125 may be configured as or otherwise support a means for transmitting a second indication of each candidate uplink grant of the set of multiple candidate uplink grants. In some examples, the candidate uplink grant component 1125 may be configured as or otherwise support a means for transmitting a second indication of a first candidate uplink grant of the set of multiple candidate uplink grants. In some examples, the candidate uplink grant component 1125 may be configured as or otherwise support a means for transmitting a third indication of a number of resource block sets including an offset between the first candidate uplink grant and an additional one or more candidate uplink grants of the set of multiple candidate uplink grants.

In some examples, the capability component 1135 may be configured as or otherwise support a means for receiving, from the UE, a capability message indicating a capability of the UE to select a candidate uplink grant of the set of multiple candidate uplink grants, where transmitting the control signaling is based on the received capability message.

In some examples, to support transmitting the control signaling, the candidate uplink grant component 1125 may be configured as or otherwise support a means for transmitting first control signaling including an indication of a list of candidate uplink grants, a portion of the list of candidate uplink grants including the set of multiple candidate uplink grants. In some examples, to support transmitting the control signaling, the candidate uplink grant component 1125 may be configured as or otherwise support a means for transmitting second control signaling activating the set of multiple candidate uplink grants.

Figure 12:
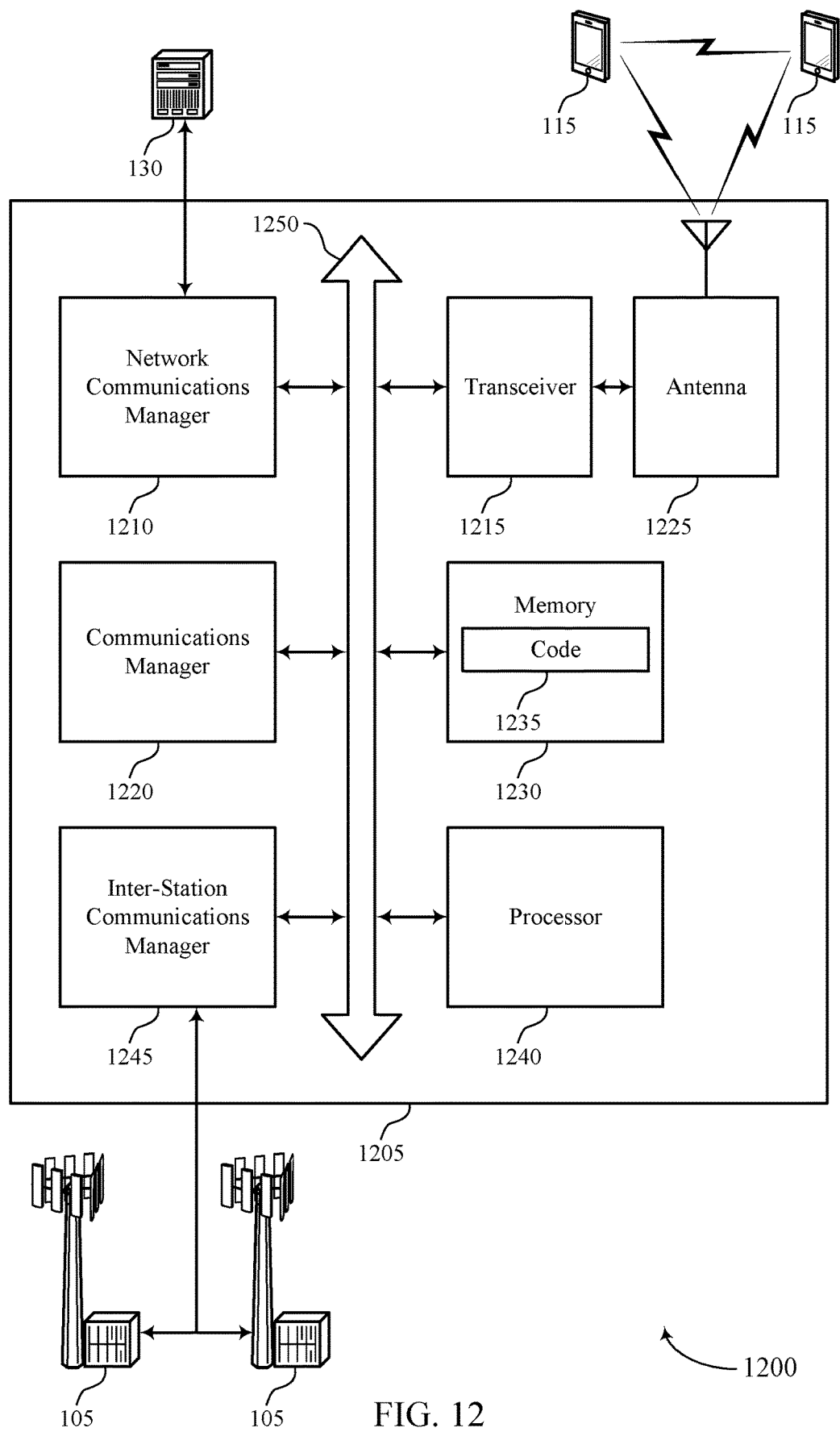
FIG. 12 shows a diagram of a system including a device that supports candidate uplink grants for channel access in accordance with aspects of the present disclosure.

FIG. 12 shows a diagram of a system 1200 including a device 1205 that supports candidate uplink grants for channel access in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting candidate uplink grants for channel access). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band. The communications manager 1220 may be configured as or otherwise support a means for receiving an uplink transmission based on a selected candidate uplink grant.

By including or configuring the communications manager 1220 in accordance with examples as described herein, the device 1205 may support techniques for a base station to configure a UE with multiple candidate uplink grants for an uplink grant, which may result in reduced latency, more efficient utilization of communication resources, improved utilization of processing capability based on the UE selecting a candidate uplink grant that indicates available resource block sets for an uplink transmission.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of candidate uplink grants for channel access as described herein, or the processor 1240 and the memory 1230 may be otherwise configured to perform or support such operations.

Figure 13:
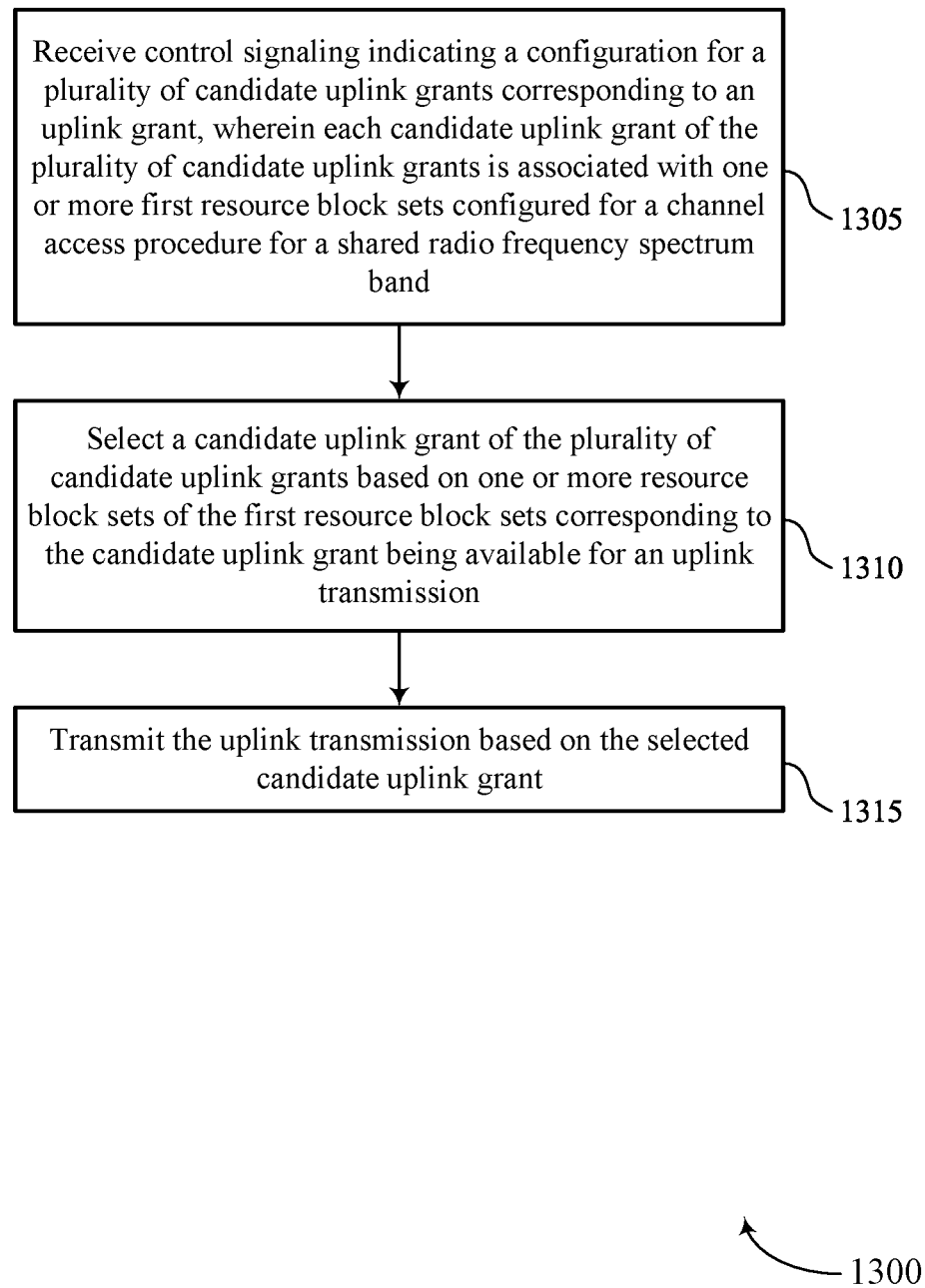
FIGS. 13 through 17 show flowcharts illustrating methods that support candidate uplink grants for channel access in accordance with aspects of the present disclosure.

FIG. 13 shows a flowchart illustrating a method 1300 that supports candidate uplink grants for channel access in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band. The operations of 1305 may be performed in accordance with examples as disclosed herein. In some examples, aspects of the operations of 1305 may be performed by a candidate uplink grant component 725 as described with reference to FIG. 7.

At 1310, the method may include selecting a candidate uplink grant of the set of multiple candidate uplink grants based on one or more resource block sets of the first resource block sets corresponding to the candidate uplink grant being available for an uplink transmission. The operations of 1310 may be performed in accordance with examples as disclosed herein. In some examples, aspects of the operations of 1310 may be performed by a resource block set component 730 as described with reference to FIG. 7.

At 1315, the method may include transmitting the uplink transmission based on the selected candidate uplink grant.

The operations of 1315 may be performed in accordance with examples as disclosed herein. In some examples, aspects of the operations of 1315 may be performed by an uplink transmission component 735 as described with reference to FIG. 7.

Figure 14:
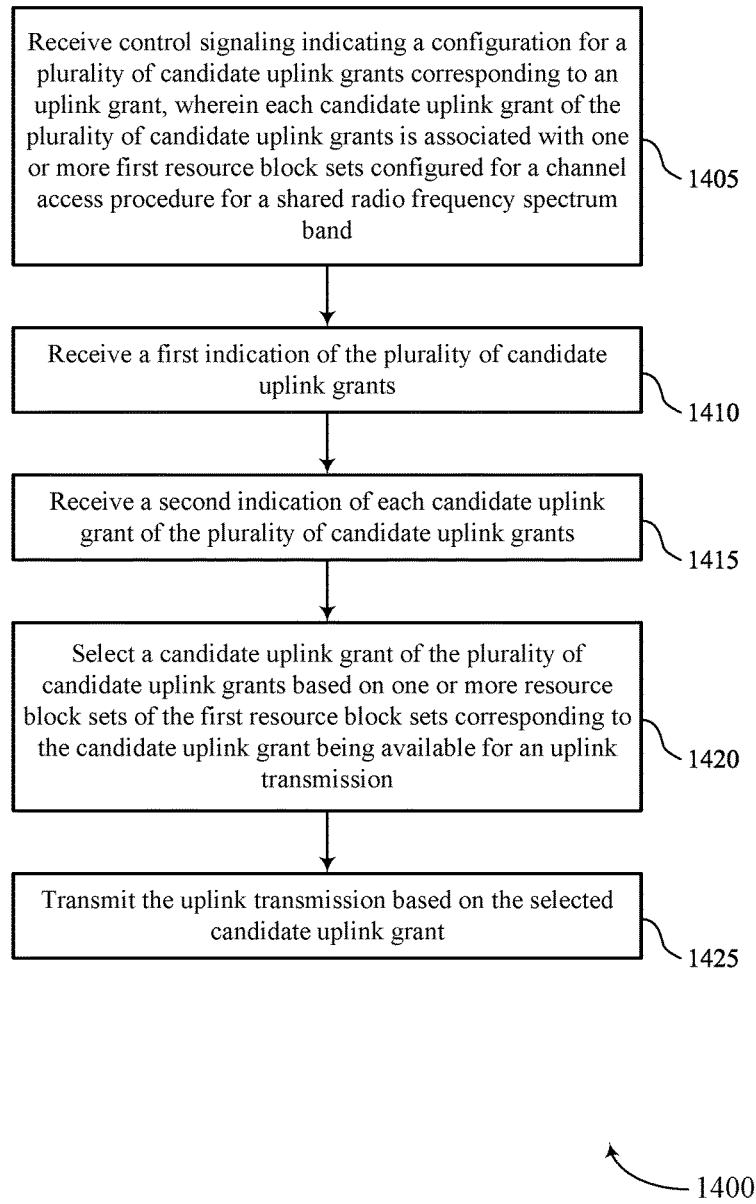

FIG. 14 shows a flowchart illustrating a method 1400 that supports candidate uplink grants for channel access in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band. The operations of 1405 may be performed in accordance with examples as disclosed herein. In some examples, aspects of the operations of 1405 may be performed by a candidate uplink grant component 725 as described with reference to FIG. 7.

At 1410, the method may include receiving a first indication of the set of multiple candidate uplink grants. The operations of 1410 may be performed in accordance with examples as disclosed herein. In some examples, aspects of the operations of 1410 may be performed by a candidate uplink grant component 725 as described with reference to FIG. 7.

At 1415, the method may include receiving a second indication of each candidate uplink grant of the set of multiple candidate uplink grants. The operations of 1415 may be performed in accordance with examples as disclosed herein. In some examples, aspects of the operations of 1415 may be performed by a candidate uplink grant component 725 as described with reference to FIG. 7.

At 1420, the method may include selecting a candidate uplink grant of the set of multiple candidate uplink grants based on one or more resource block sets of the first resource block sets corresponding to the candidate uplink grant being available for an uplink transmission. The operations of 1420 may be performed in accordance with examples as disclosed herein. In some examples, aspects of the operations of 1420 may be performed by a resource block set component 730 as described with reference to FIG. 7.

At 1425, the method may include transmitting the uplink transmission based on the selected candidate uplink grant. The operations of 1425 may be performed in accordance with examples as disclosed herein. In some examples, aspects of the operations of 1425 may be performed by an uplink transmission component 735 as described with reference to FIG. 7.

Figure 15:
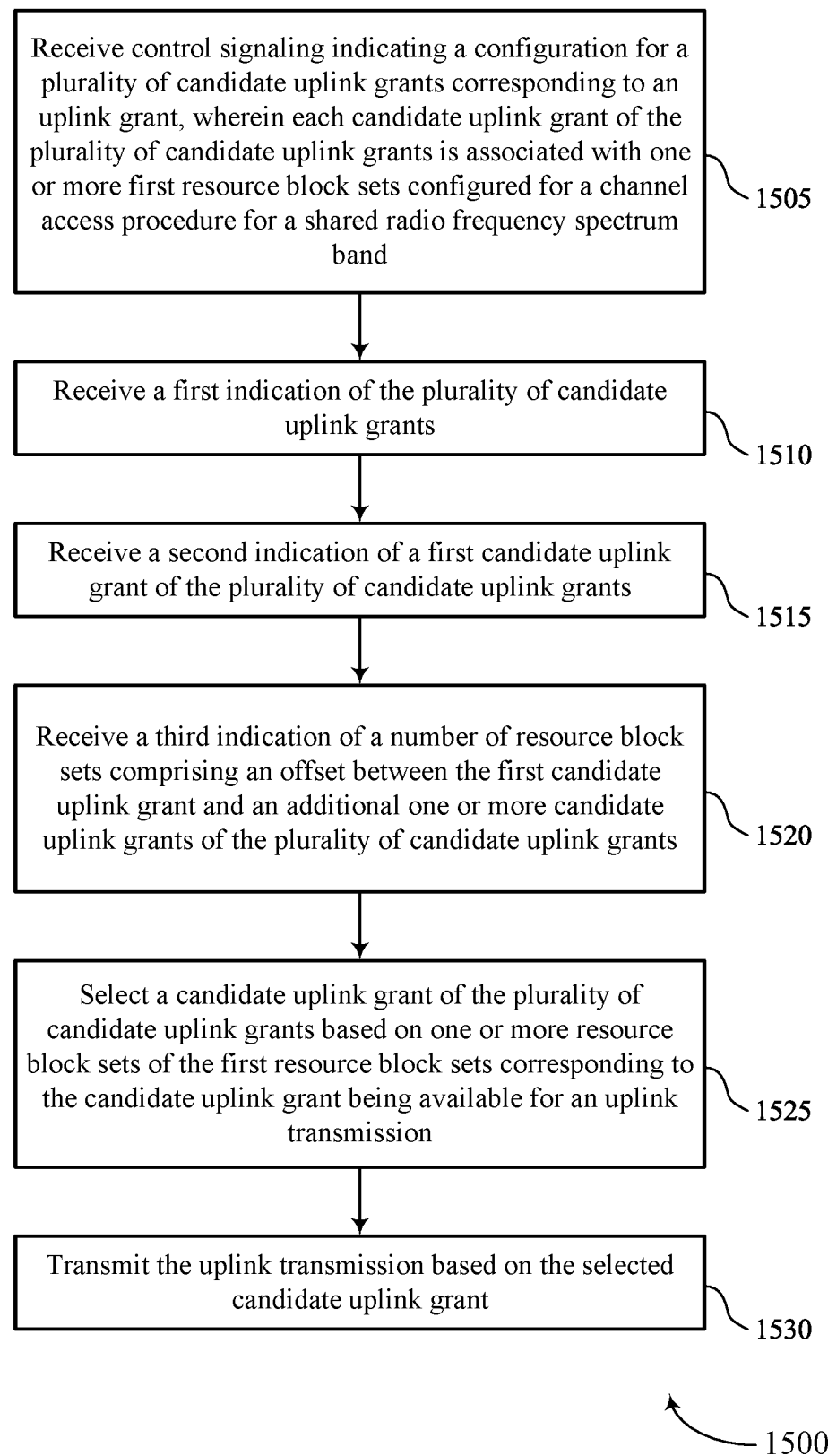

FIG. 15 shows a flowchart illustrating a method 1500 that supports candidate uplink grants for channel access in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band. The operations of 1505 may be performed in accordance with examples as disclosed herein. In some examples, aspects of the operations of 1505 may be performed by a candidate uplink grant component 725 as described with reference to FIG. 7.

At 1510, the method may include receiving a first indication of the set of multiple candidate uplink grants. The operations of 1510 may be performed in accordance with examples as disclosed herein. In some examples, aspects of the operations of 1510 may be performed by a candidate uplink grant component 725 as described with reference to FIG. 7.

At 1515, the method may include receiving a second indication of a first candidate uplink grant of the set of multiple candidate uplink grants. The operations of 1515 may be performed in accordance with examples as disclosed herein. In some examples, aspects of the operations of 1515 may be performed by a candidate uplink grant component 725 as described with reference to FIG. 7.

At 1520, the method may include receiving a third indication of a number of resource block sets including an offset between the first candidate uplink grant and an additional one or more candidate uplink grants of the set of multiple candidate uplink grants. The operations of 1520 may be performed in accordance with examples as disclosed herein. In some examples, aspects of the operations of 1520 may be performed by a candidate uplink grant component 725 as described with reference to FIG. 7.

At 1525, the method may include selecting a candidate uplink grant of the set of multiple candidate uplink grants based on one or more resource block sets of the first resource block sets corresponding to the candidate uplink grant being available for an uplink transmission. The operations of 1525 may be performed in accordance with examples as disclosed herein. In some examples, aspects of the operations of 1525 may be performed by a resource block set component 730 as described with reference to FIG. 7.

At 1530, the method may include transmitting the uplink transmission based on the selected candidate uplink grant. The operations of 1530 may be performed in accordance with examples as disclosed herein. In some examples, aspects of the operations of 1530 may be performed by an uplink transmission component 735 as described with reference to FIG. 7.

Figure 16:
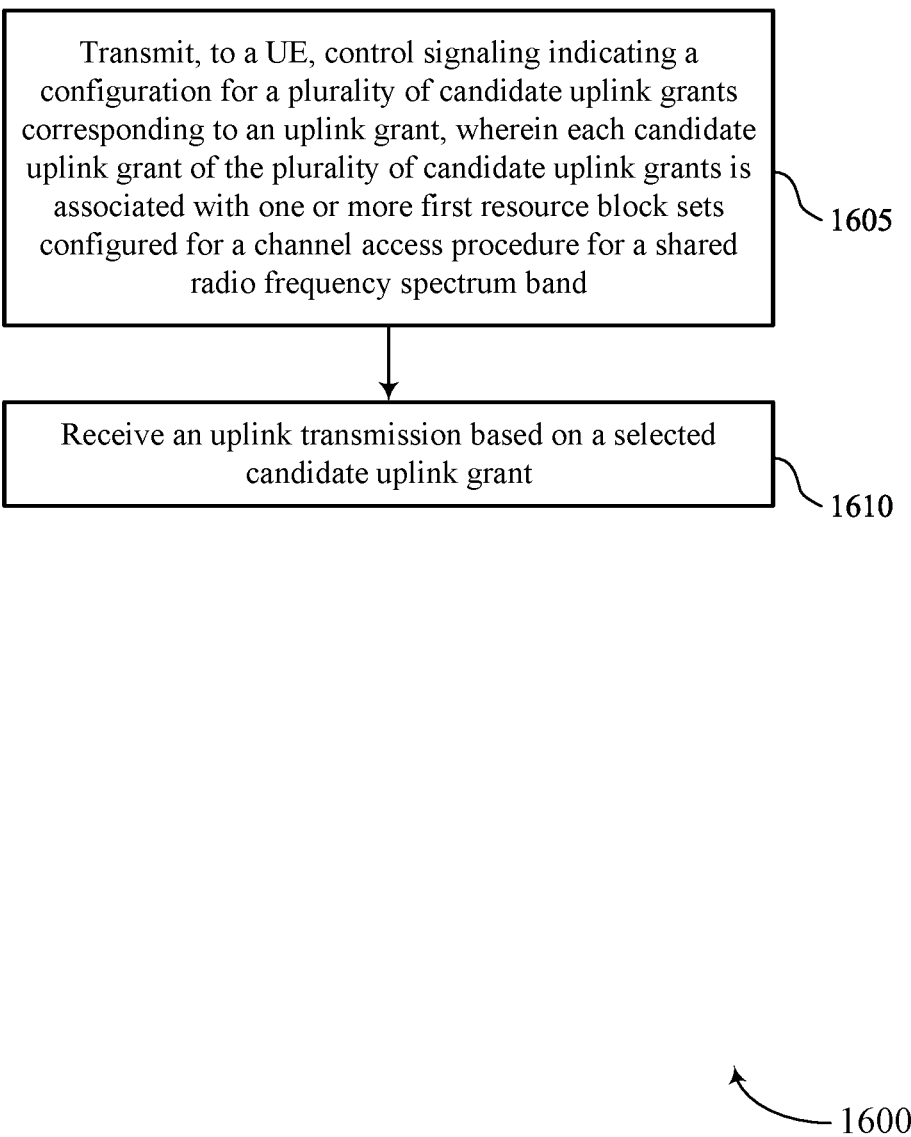

FIG. 16 shows a flowchart illustrating a method 1600 that supports candidate uplink grants for channel access in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, control signaling indicating a configuration for a set of multiple candidate uplink grants corresponding to an uplink grant, where each candidate uplink grant of the set of multiple candidate uplink grants is associated with one or more first resource block sets configured for a channel access procedure for a shared radio frequency spectrum band. The operations of 1605 may be performed in accordance with examples as disclosed herein. In some examples, aspects of the operations of 1605 may be performed by a candidate uplink grant component 1125 as described with reference to FIG. 11.

At 1610, the method may include receiving an uplink transmission based on a selected candidate uplink grant. The operations of 1610 may be performed in accordance with examples as disclosed herein. In some examples, aspects of the operations of 1610 may be performed by an uplink transmission component 1130 as described with reference to FIG. 11.

Figure 17:
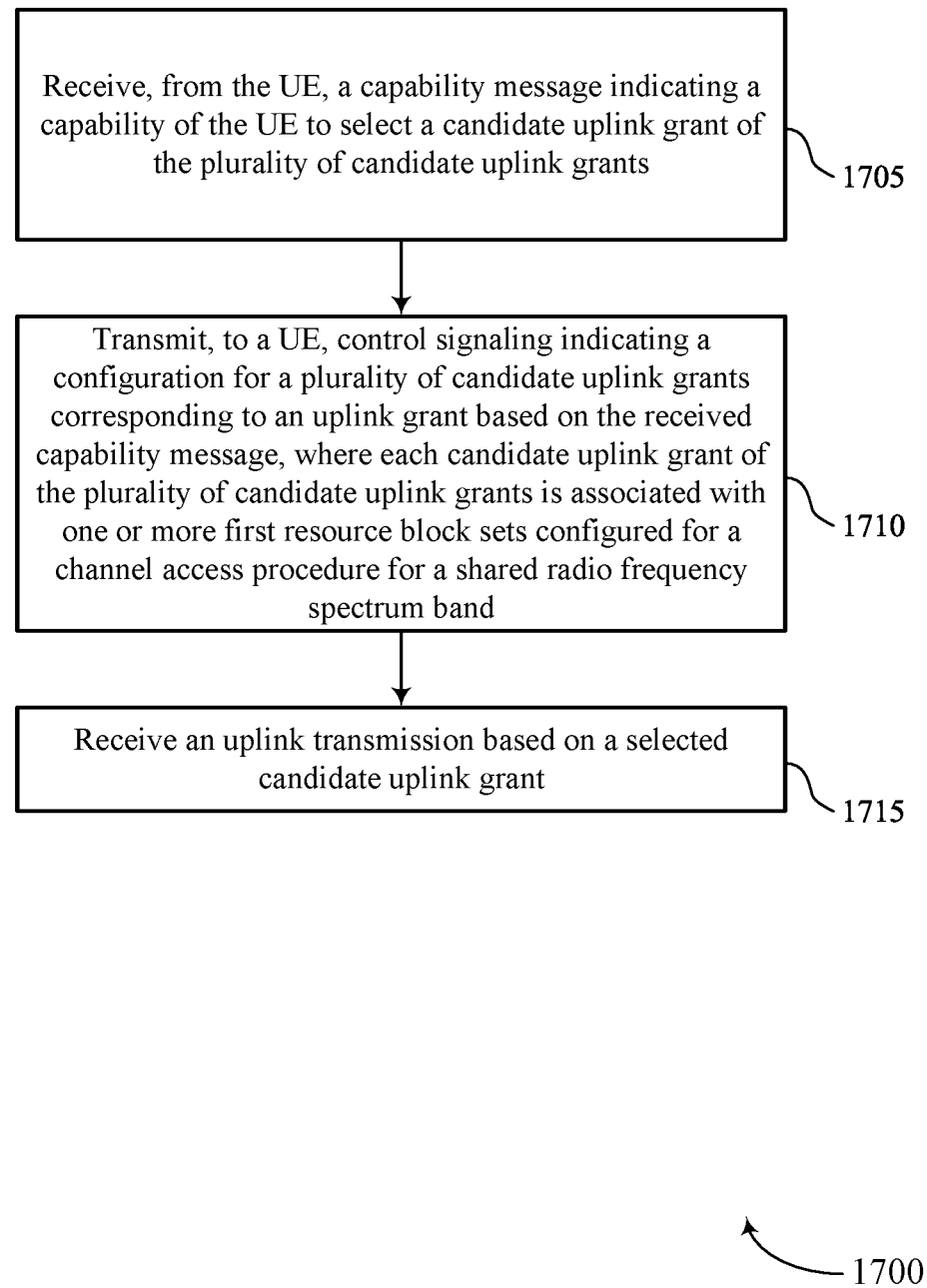

FIG. 17 shows a flowchart illustrating a method 1700 that supports candidate uplink grants for channel access in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include receiving, from the UE, a capability message indicating a capability of the UE to select a candidate uplink grant of the set of multiple candidate uplink grants. The operations of 1705 may be performed in accordance with examples as disclosed herein. In some examples, aspects of the operations of 1705 may be performed by a capability component 1135 as described with reference to FIG. 11.

At 1710, the method may include transmitting, to a UE, control signaling indicating a configuration for a set of multiple candidate uplink grants corresponding to an uplink grant based on the received capability message, where each candidate uplink grant of the set of multiple candidate uplink grants is associated with one or more first resource block sets configured for a channel access procedure for a shared radio frequency spectrum band. The operations of 1710 may be performed in accordance with examples as disclosed herein. In some examples, aspects of the operations of 1710 may be performed by a candidate uplink grant component 1125 as described with reference to FIG. 11.

At 1715, the method may include receiving an uplink transmission based on a selected candidate uplink grant. The operations of 1715 may be performed in accordance with examples as disclosed herein. In some examples, aspects of the operations of 1715 may be performed by an uplink transmission component 1130 as described with reference to FIG. 11. The following provides an overview of aspects of the present disclosure:

Aspect 1: A method for wireless communications at a UE, comprising: receiving control signaling indicating a configuration for a plurality of candidate uplink grants corresponding to an uplink grant, wherein each candidate uplink grant of the plurality of candidate uplink grants is associated with one or more first resource block sets configured for a channel access procedure for a shared radio frequency spectrum band; selecting a candidate uplink grant of the plurality of candidate uplink grants based at least in part on one or more resource block sets of the one or more first resource block sets corresponding to the candidate uplink grant being available for an uplink transmission; and transmitting the uplink transmission based at least in part on the selected candidate uplink grant.

Aspect 2: The method of aspect 1, wherein selecting the candidate uplink grant comprises: performing the channel access procedure for the one or more resource block sets of the one or more first resource block sets; and determining the one or more resource block sets are available for the uplink transmission based at least in part on the channel access procedure.

Aspect 3: The method of any of aspects 1 through 2, wherein receiving the control signaling comprises: receiving a first indication of the plurality of candidate uplink grants.

Aspect 4: The method of aspect 3, further comprising: receiving a second indication of each candidate uplink grant of the plurality of candidate uplink grants.

Aspect 5: The method of aspect 3, further comprising: receiving a second indication of a first candidate uplink grant of the plurality of candidate uplink grants; and receiving a third indication of a number of resource block sets comprising an offset between the first candidate uplink grant and an additional one or more candidate uplink grants of the plurality of candidate uplink grants.

Aspect 6: The method of any of aspects 1 through 5, further comprising: transmitting, to a base station, a capability message indicating a capability of the UE to select a candidate uplink grant of the plurality of candidate uplink grants, wherein receiving the control signaling is based at least in part on the transmitted capability message.

Aspect 7: The method of any of aspects 1 through 6, wherein receiving the control signaling comprises: receiving first control signaling comprising an indication of a list of candidate uplink grants, a portion of the list of candidate uplink grants comprising the plurality of candidate uplink grants; and receiving second control signaling activating the plurality of candidate uplink grants.

Aspect 8: The method of any of aspects 1 through 7, wherein selecting the candidate uplink grant comprises: evaluating an order rule associated with the plurality of candidate uplink grants.

Aspect 9: The method of aspect 8, wherein the order rule is based at least in part on an index of the one or more first resource block sets.

Aspect 10: The method of any of aspects 8 through 9, wherein the order rule is based at least in part on a transmission rate of the uplink transmission.

Aspect 11: A method for wireless communications at a base station, comprising: transmitting, to a UE, control signaling indicating a configuration for a plurality of candidate uplink grants corresponding to an uplink grant, wherein each candidate uplink grant of the plurality of candidate uplink grants is associated with one or more first resource block sets configured for a channel access procedure for a shared radio frequency spectrum band; and receiving an uplink transmission based at least in part on a selected candidate uplink grant.

Aspect 12: The method of aspect 11, wherein transmitting the control signaling comprises: transmitting a first indication of the plurality of candidate uplink grants.

Aspect 13: The method of aspect 12, further comprising: transmitting a second indication of each candidate uplink grant of the plurality of candidate uplink grants.

Aspect 14: The method of aspect 12, further comprising: transmitting a second indication of a first candidate uplink grant of the plurality of candidate uplink grants; and transmitting a third indication of a number of resource block sets comprising an offset between the first candidate uplink grant and an additional one or more candidate uplink grants of the plurality of candidate uplink grants.

Aspect 15: The method of any of aspects 11 through 14, further comprising: receiving, from the UE, a capability message indicating a capability of the UE to select a candidate uplink grant of the plurality of candidate uplink grants, wherein transmitting the control signaling is based at least in part on the received capability message.

Aspect 16: The method of any of aspects 11 through 15, wherein transmitting the control signaling comprises: transmitting first control signaling comprising an indication of a list of candidate uplink grants, a portion of the list of candidate uplink grants comprising the plurality of candidate uplink grants; and transmitting second control signaling activating the plurality of candidate uplink grants.

Aspect 17: An apparatus for wireless communications at a UE, comprising a processor; memory coupled with the processor; and instructions stored in the memory and executable by the processor to cause the apparatus to perform a method of any of aspects 1 through 10.

Aspect 18: An apparatus for wireless communications at a UE, comprising at least one means for performing a method of any of aspects 1 through 10.

Aspect 19: A non-transitory computer-readable medium storing code for wireless communications at a UE, the code comprising instructions executable by a processor to perform a method of any of aspects 1 through 10.

Aspect 20: An apparatus for wireless communications at a base station, comprising a processor; memory coupled with the processor; and instructions stored in the memory and executable by the processor to cause the apparatus to perform a method of any of aspects 11 through 16.

Aspect 21: An apparatus for wireless communications at a base station, comprising at least one means for performing a method of any of aspects 11 through 16.

Aspect 22: A non-transitory computer-readable medium storing code for wireless communications at a base station, the code comprising instructions executable by a processor to perform a method of any of aspects 11 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving control signaling indicating a configuration for a plurality of candidate uplink grants corresponding to an uplink grant, wherein each candidate uplink grant of the plurality of candidate uplink grants is associated with one or more first resource block sets configured for a channel access procedure for a shared radio frequency spectrum band;
selecting a candidate uplink grant of the plurality of candidate uplink grants based at least in part on one or more resource block sets of the one or more first resource block sets corresponding to the candidate uplink grant being available for an uplink transmission, wherein the candidate uplink grant being available is based at least in part on sensing a respective channel energy associated with each candidate uplink grant of the plurality of candidate uplink grants in accordance with the channel access procedure; and
transmitting the uplink transmission based at least in part on the selected candidate uplink grant.

2. The method of claim 1, wherein selecting the candidate uplink grant comprises:
performing the channel access procedure for the one or more resource block sets of the one or more first resource block sets; and
determining the one or more resource block sets are available for the uplink transmission based at least in part on the channel access procedure.

3. The method of claim 1, wherein receiving the control signaling comprises:
receiving a first indication of the plurality of candidate uplink grants.

4. The method of claim 3, further comprising:
receiving a second indication of each candidate uplink grant of the plurality of candidate uplink grants.

5. The method of claim 3, further comprising:
receiving a second indication of a first candidate uplink grant of the plurality of candidate uplink grants; and
receiving a third indication of a quantity of resource block sets comprising an offset between the first candidate uplink grant and an additional one or more candidate uplink grants of the plurality of candidate uplink grants.

6. The method of claim 1, further comprising:
transmitting, to a network entity, a capability message indicating a capability of the UE to select the candidate uplink grant of the plurality of candidate uplink grants, wherein receiving the control signaling is based at least in part on the transmitted capability message.

7. The method of claim 1, wherein receiving the control signaling comprises:
receiving first control signaling comprising an indication of a list of candidate uplink grants, a portion of the list of candidate uplink grants comprising the plurality of candidate uplink grants; and
receiving second control signaling activating the plurality of candidate uplink grants.

8. The method of claim 1, wherein selecting the candidate uplink grant comprises:
evaluating an order rule associated with the plurality of candidate uplink grants.

9. The method of claim 8, wherein the order rule is based at least in part on an index of the one or more first resource block sets.

10. The method of claim 8, wherein the order rule is based at least in part on a transmission rate of the uplink transmission.

11. A method for wireless communications at a network entity, comprising:
transmitting, to a user equipment (UE), control signaling indicating a configuration for a plurality of candidate uplink grants corresponding to an uplink grant, wherein each candidate uplink grant of the plurality of candidate uplink grants is associated with one or more first resource block sets configured for a channel access procedure for a shared radio frequency spectrum band; and
receiving an uplink transmission based at least in part on a candidate uplink grant selected in accordance with the channel access procedure, the channel access procedure associated with a respective channel energy for each candidate uplink grant of the plurality of candidate uplink grants.

12. The method of claim 11, wherein transmitting the control signaling comprises:
transmitting a first indication of the plurality of candidate uplink grants.

13. The method of claim 12, further comprising:
transmitting a second indication of each candidate uplink grant of the plurality of candidate uplink grants.

14. The method of claim 12, further comprising:
transmitting a second indication of a first candidate uplink grant of the plurality of candidate uplink grants; and transmitting a third indication of a quantity of resource block sets comprising an offset between the first candidate uplink grant and an additional one or more candidate uplink grants of the plurality of candidate uplink grants.

15. The method of claim 11, further comprising:
receiving, from the UE, a capability message indicating a capability of the UE to select the candidate uplink grant of the plurality of candidate uplink grants, wherein transmitting the control signaling is based at least in part on the received capability message.

16. The method of claim 11, wherein transmitting the control signaling comprises:
transmitting first control signaling comprising an indication of a list of candidate uplink grants, a portion of the list of candidate uplink grants comprising the plurality of candidate uplink grants; and
transmitting second control signaling activating the plurality of candidate uplink grants.

17. An apparatus for wireless communications at a user equipment (UE), comprising:
a processor;
memory coupled with the processor; and
instructions stored in the memory and executable by the processor to cause the apparatus to:
receive control signaling indicating a configuration for a plurality of candidate uplink grants corresponding to an uplink grant, wherein each candidate uplink grant of the plurality of candidate uplink grants is associated with one or more first resource block sets configured for a channel access procedure for a shared radio frequency spectrum band;
select a candidate uplink grant of the plurality of candidate uplink grants based at least in part on one or more resource block sets of the one or more first resource block sets corresponding to the candidate uplink grant being available for an uplink transmission, wherein the candidate uplink grant being available is based at least in part on sensing a respective channel energy associated with each candidate uplink grant of the plurality of candidate uplink grants; and
transmit the uplink transmission based at least in part on the selected candidate uplink grant.

18. The apparatus of claim 17, wherein the instructions to select the candidate uplink grant are executable by the processor to cause the apparatus to:
perform the channel access procedure for the one or more resource block sets of the one or more first resource block sets; and
determine the one or more resource block sets are available for the uplink transmission based at least in part on the channel access procedure.

19. The apparatus of claim 17, wherein the instructions to receive the control signaling are executable by the processor to cause the apparatus to:
receive a first indication of the plurality of candidate uplink grants.

20. The apparatus of claim 19, wherein the instructions are further executable by the processor to cause the apparatus to:
receive a second indication of each candidate uplink grant of the plurality of candidate uplink grants.

21. The apparatus of claim 19, wherein the instructions are further executable by the processor to cause the apparatus to:

receive a second indication of a first candidate uplink grant of the plurality of candidate uplink grants; and
receive a third indication of a quantity of resource block sets comprising an offset between the first candidate uplink grant and an additional one or more candidate uplink grants of the plurality of candidate uplink grants.

22. The apparatus of claim 17, wherein the instructions are further executable by the processor to cause the apparatus to:
transmit, to a network entity, a capability message indicating a capability of the UE to select the candidate uplink grant of the plurality of candidate uplink grants, wherein receiving the control signaling is based at least in part on the transmitted capability message.

23. The apparatus of claim 17, wherein the instructions to receive the control signaling are executable by the processor to cause the apparatus to:
receive first control signaling comprising an indication of a list of candidate uplink grants, a portion of the list of candidate uplink grants comprising the plurality of candidate uplink grants; and
receive second control signaling activating the plurality of candidate uplink grants.

24. The apparatus of claim 17, wherein the instructions to select the candidate uplink grant are executable by the processor to cause the apparatus to:
evaluate an order rule associated with the plurality of candidate uplink grants.

25. The apparatus of claim 24, wherein the order rule is based at least in part on an index of the one or more first resource block sets.

26. The apparatus of claim 24, wherein the order rule is based at least in part on a transmission rate of the uplink transmission.

27. An apparatus for wireless communications at a network entity, comprising:
a processor;
memory coupled with the processor; and
instructions stored in the memory and executable by the processor to cause the apparatus to:
transmit, to a user equipment (UE), control signaling indicating a configuration for a plurality of candidate uplink grants corresponding to an uplink grant, wherein each candidate uplink grant of the plurality of candidate uplink grants is associated with one or more first resource block sets configured for a channel access procedure for a shared radio frequency spectrum band; and
receive an uplink transmission based at least in part on a candidate uplink grant selected in accordance with the channel access procedure, the channel access procedure associated with a respective channel energy for each candidate uplink grant of the plurality of candidate uplink grants.

28. The apparatus of claim 27, wherein the instructions to transmit the control signaling are executable by the processor to cause the apparatus to:
transmit a first indication of the plurality of candidate uplink grants.

29. The apparatus of claim 27, wherein the instructions are further executable by the processor to cause the apparatus to:
receive, from the UE, a capability message indicating a capability of the UE to select the candidate uplink grant of the plurality of candidate uplink grants, wherein transmitting the control signaling is based at least in part on the received capability message.

30. The apparatus of claim 27, wherein the instructions to transmit the control signaling are executable by the processor to cause the apparatus to:
- transmit first control signaling comprising an indication of a list of candidate uplink grants, a portion of the list of candidate uplink grants comprising the plurality of candidate uplink grants; and
- transmit second control signaling activating the plurality of candidate uplink grants.

\* \* \* \* \*